United States Patent
Bayliss

(10) Patent No.: US 9,037,606 B2
(45) Date of Patent: May 19, 2015

(54) INTERNAL LINKING CO-CONVERGENCE USING CLUSTERING WITH HIERARCHY

(71) Applicant: LexisNexis Risk Solutions FL Inc., Boca Raton, FL (US)

(72) Inventor: David Alan Bayliss, Delray Beach, FL (US)

(73) Assignee: LEXISNEXIS RISK SOLUTIONS FL INC., Boca Raton, FL (US)

( * ) Notice: Subject to any disclaimer, the term of this patent is extended or adjusted under 35 U.S.C. 154(b) by 0 days.

(21) Appl. No.: 14/029,710

(22) Filed: Sep. 17, 2013

(65) Prior Publication Data

US 2014/0032557 A1    Jan. 30, 2014

Related U.S. Application Data

(63) Continuation of application No. 13/648,709, filed on Oct. 10, 2012, now Pat. No. 8,676,838, and a continuation-in-part of application No. 12/637,286, filed on Dec. 14, 2009.

(51) Int. Cl.
G06F 17/30    (2006.01)

(52) U.S. Cl.
CPC .... *G06F 17/30477* (2013.01); *G06F 17/30303* (2013.01); *G06F 17/30386* (2013.01); *G06F 17/30705* (2013.01); *G06F 17/30424* (2013.01); *G06F 17/30598* (2013.01)

(58) Field of Classification Search
USPC .............. 707/1, 100, 770; 709/204–206
See application file for complete search history.

(56) References Cited

U.S. PATENT DOCUMENTS

| | | |
|---|---|---|
| 4,543,630 A | 9/1985 | Neches |
| 4,769,772 A | 9/1988 | Dwyer |
| 4,860,201 A | 8/1989 | Stolfo et al. |
| 4,870,568 A | 9/1989 | Kahle et al. |
| 4,925,311 A | 5/1990 | Neches et al. |
| 5,006,978 A | 4/1991 | Neches |
| 5,146,590 A | 9/1992 | Lorie et al. |

(Continued)

OTHER PUBLICATIONS

International Search Report and Written Opionion mailed Oct. 22, 2009, for International Application No. PCT/US09/49522.

(Continued)

*Primary Examiner* — Etienne Leroux
(74) *Attorney, Agent, or Firm* — Troutman Sanders LLP; Ryan A. Schneider; Mark Lehi Jones

(57) ABSTRACT

Certain implementations of the disclosed technology include systems and methods for internal co-convergence using clustering when there is hierarchy in the data structure. A method is included for clustering hierarchical database records into a first set of clusters having corresponding first cluster identifications (IDs), each hierarchical database record including one or more field values, the clustering based at least in part on determining similarity among corresponding field values of the hierarchical database records. The method includes receiving parent-child hierarchical relationship information for the hierarchical database records, re-clustering at least a portion of the hierarchical database records into a second set of clusters having corresponding second cluster IDs, the re-clustering based at least in part on the received parent-child hierarchical relationship information, and outputting hierarchical database record information, based at least in part on the re-clustering.

20 Claims, 19 Drawing Sheets

(56) References Cited

U.S. PATENT DOCUMENTS

| | | |
|---|---|---|
| 5,251,131 A | 10/1993 | Masand et al. |
| 5,276,899 A | 1/1994 | Neches |
| 5,303,383 A | 4/1994 | Neches et al. |
| 5,392,430 A | 2/1995 | Chen et al. |
| 5,408,649 A | 4/1995 | Beshears et al. |
| 5,423,037 A | 6/1995 | Hvasshovd |
| 5,457,797 A | 10/1995 | Butterworth et al. |
| 5,471,622 A | 11/1995 | Eadline |
| 5,495,606 A | 2/1996 | Borden et al. |
| 5,551,027 A | 8/1996 | Choy et al. |
| 5,551,066 A | 8/1996 | Stillman et al. |
| 5,555,404 A | 9/1996 | Torbjornsen et al. |
| 5,590,284 A | 12/1996 | Crosetto |
| 5,590,319 A | 12/1996 | Cohen et al. |
| 5,640,485 A | 6/1997 | Ranta |
| 5,655,080 A | 8/1997 | Dias et al. |
| 5,692,174 A | 11/1997 | Birely et al. |
| 5,694,593 A | 12/1997 | Baclawski |
| 5,715,469 A | 2/1998 | Arning |
| 5,732,400 A | 3/1998 | Mandler et al. |
| 5,745,746 A | 4/1998 | Jhingran et al. |
| 5,754,841 A | 5/1998 | Carino |
| 5,758,314 A | 5/1998 | McKenna |
| 5,799,323 A | 8/1998 | Mosher et al. |
| 5,845,113 A | 12/1998 | Swami et al. |
| 5,857,180 A | 1/1999 | Hallmark et al. |
| 5,878,408 A | 3/1999 | Van Huben et al. |
| 5,884,299 A | 3/1999 | Ramesh et al. |
| 5,890,159 A | 3/1999 | Sealby et al. |
| 5,897,638 A | 4/1999 | Lasser et al. |
| 5,905,904 A | 5/1999 | Bird et al. |
| 5,920,845 A | 7/1999 | Risemberg |
| 5,970,495 A | 10/1999 | Baru et al. |
| 5,983,228 A | 11/1999 | Kobayashi et al. |
| 6,006,249 A | 12/1999 | Leong |
| 6,026,394 A | 2/2000 | Tsuchida et al. |
| 6,026,398 A | 2/2000 | Brown et al. |
| 6,081,801 A | 6/2000 | Cochrane et al. |
| 6,108,763 A | 8/2000 | Grondalski |
| 6,115,713 A | 9/2000 | Pascucci et al. |
| 6,192,391 B1 | 2/2001 | Ohtani |
| 6,199,069 B1 | 3/2001 | Dettinger et al. |
| 6,256,621 B1 | 7/2001 | Tsuchida et al. |
| 6,266,804 B1 | 7/2001 | Isman |
| 6,304,882 B1 | 10/2001 | Strellis et al. |
| 6,311,169 B2 | 10/2001 | Duhon |
| 6,330,552 B1 | 12/2001 | Farrar et al. |
| 6,360,361 B1 | 3/2002 | Larus et al. |
| 6,374,241 B1 | 4/2002 | Lamburt et al. |
| 6,377,959 B1 | 4/2002 | Carlson |
| 6,389,429 B1 | 5/2002 | Kane et al. |
| 6,424,973 B1 | 7/2002 | Baclawski |
| 6,426,947 B1 | 7/2002 | Banker et al. |
| 6,427,148 B1 | 7/2002 | Cossock |
| 6,430,552 B1 | 8/2002 | Corston-Oliver |
| 6,510,428 B2 | 1/2003 | Tsuchida et al. |
| 6,523,019 B1 | 2/2003 | Borthwick |
| 6,523,041 B1 | 2/2003 | Morgan et al. |
| 6,546,403 B1 | 4/2003 | Carlson et al. |
| 6,567,806 B1 | 5/2003 | Tsuchida et al. |
| 6,658,412 B1 | 12/2003 | Jenkins et al. |
| 6,785,370 B2 | 8/2004 | Glowny et al. |
| 6,816,854 B2 | 11/2004 | Reiner et al. |
| 6,963,871 B1 | 11/2005 | Hermansen et al. |
| 6,968,335 B2 | 11/2005 | Bayliss et al. |
| 6,983,317 B1 | 1/2006 | Bishop et al. |
| 6,990,503 B1 | 1/2006 | Luo et al. |
| 7,028,024 B1 | 4/2006 | Kommers et al. |
| 7,143,091 B2 | 11/2006 | Charnock et al. |
| 7,152,060 B2 | 12/2006 | Borthwick et al. |
| 7,185,003 B2 | 2/2007 | Bayliss et al. |
| 7,240,059 B2 | 7/2007 | Bayliss et al. |
| 7,293,024 B2 | 11/2007 | Bayliss et al. |
| 7,333,998 B2 | 2/2008 | Heckerman et al. |
| 7,403,942 B1 | 7/2008 | Bayliss |
| 7,657,540 B1 | 2/2010 | Bayliss |
| 7,752,064 B2 | 7/2010 | Kauffman |
| 7,912,842 B1 | 3/2011 | Bayliss |
| 7,945,581 B2 | 5/2011 | Bayliss et al. |
| 2001/0013049 A1 | 8/2001 | Ellis, III |
| 2001/0014888 A1 | 8/2001 | Tsuchida et al. |
| 2002/0007284 A1 | 1/2002 | Schurenberg et al. |
| 2002/0065870 A1 | 5/2002 | Baehr-Jones et al. |
| 2002/0073099 A1 | 6/2002 | Gilbert et al. |
| 2002/0073138 A1 | 6/2002 | Gilbert et al. |
| 2002/0156793 A1 | 10/2002 | Jaro |
| 2002/0161736 A1* | 10/2002 | Beygelzimer et al. ............ 707/1 |
| 2002/0184222 A1 | 12/2002 | Kohut et al. |
| 2003/0013951 A1 | 1/2003 | Stefanescu et al. |
| 2003/0037048 A1 | 2/2003 | Kabra et al. |
| 2003/0050906 A1* | 3/2003 | Clifton-Bligh ................... 707/1 |
| 2003/0065595 A1 | 4/2003 | Anglum |
| 2003/0093260 A1 | 5/2003 | Dagtas et al. |
| 2003/0126102 A1 | 7/2003 | Borthwick |
| 2003/0126156 A1 | 7/2003 | Stoltenberg et al. |
| 2003/0153299 A1 | 8/2003 | Perfit et al. |
| 2003/0154285 A1 | 8/2003 | Berglund et al. |
| 2003/0167253 A1 | 9/2003 | Meinig |
| 2004/0064447 A1 | 4/2004 | Simske et al. |
| 2004/0068339 A1 | 4/2004 | Cheetham et al. |
| 2004/0088322 A1 | 5/2004 | Elder et al. |
| 2004/0098359 A1 | 5/2004 | Bayliss et al. |
| 2004/0098371 A1 | 5/2004 | Bayliss et al. |
| 2004/0098372 A1 | 5/2004 | Bayliss et al. |
| 2004/0098373 A1 | 5/2004 | Bayliss et al. |
| 2004/0098374 A1 | 5/2004 | Bayliss et al. |
| 2004/0098390 A1 | 5/2004 | Bayliss et al. |
| 2004/0172393 A1 | 9/2004 | Kazi et al. |
| 2005/0060332 A1* | 3/2005 | Bernstein et al. ............ 707/100 |
| 2005/0071743 A1 | 3/2005 | Harrington et al. |
| 2005/0154664 A1 | 7/2005 | Guy et al. |
| 2006/0020611 A1 | 1/2006 | Gilbert et al. |
| 2006/0080283 A1 | 4/2006 | Shipman et al. |
| 2006/0116995 A1 | 6/2006 | Bloedorn |
| 2006/0184460 A1 | 8/2006 | Cleary |
| 2006/0184584 A1 | 8/2006 | Dunn et al. |
| 2006/0213976 A1 | 9/2006 | Inakoshi et al. |
| 2006/0294092 A1 | 12/2006 | Giang et al. |
| 2007/0067304 A1 | 3/2007 | Ives |
| 2007/0179971 A1 | 8/2007 | Benson |
| 2007/0208694 A1 | 9/2007 | Bayliss et al. |
| 2007/0271292 A1 | 11/2007 | Acharya et al. |
| 2007/0299697 A1 | 12/2007 | Friedlander et al. |
| 2008/0005106 A1 | 1/2008 | Schumacher et al. |
| 2008/0010296 A1 | 1/2008 | Bayliss et al. |
| 2008/0016031 A1 | 1/2008 | Miao et al. |
| 2008/0033951 A1 | 2/2008 | Benson |
| 2008/0077570 A1 | 3/2008 | Tang et al. |
| 2008/0133502 A1 | 6/2008 | Gurevich et al. |
| 2008/0208780 A1 | 8/2008 | Hoopes et al. |
| 2008/0222090 A1 | 9/2008 | Sasaki |
| 2008/0222319 A1 | 9/2008 | Sato et al. |
| 2008/0226130 A1 | 9/2008 | Kansal et al. |
| 2008/0243885 A1 | 10/2008 | Harger et al. |
| 2008/0244008 A1 | 10/2008 | Wilkinson et al. |
| 2009/0012971 A1 | 1/2009 | Hunt et al. |
| 2009/0018996 A1 | 1/2009 | Hunt et al. |
| 2009/0089332 A1 | 4/2009 | Harger et al. |
| 2009/0089630 A1 | 4/2009 | Goldenberg et al. |
| 2009/0106245 A1 | 4/2009 | Salcedo |
| 2009/0271359 A1 | 10/2009 | Bayliss |
| 2009/0271363 A1 | 10/2009 | Bayliss |
| 2009/0271397 A1 | 10/2009 | Bayliss |
| 2009/0271404 A1 | 10/2009 | Bayliss |
| 2009/0271405 A1 | 10/2009 | Bayliss |
| 2009/0271424 A1 | 10/2009 | Bayliss |
| 2009/0271694 A1 | 10/2009 | Bayliss |
| 2009/0287689 A1 | 11/2009 | Bayliss |
| 2009/0292694 A1 | 11/2009 | Bayliss |
| 2009/0292695 A1 | 11/2009 | Bayliss |
| 2011/0106807 A1 | 5/2011 | Srihari et al. |

OTHER PUBLICATIONS

International Search Report and Written Opinion mailed Aug. 13, 2009, for International Application No. PCT-US09/41649.

(56) References Cited

OTHER PUBLICATIONS

Price, et al., "Face Recognition Using Direct, Weighted Linear Discriminant Analysis and Modular Subspaces" [online]; Oak Ridge National Laboratory (2005).
Eike Schallehn et al., "Advanced Grouping and Aggregation for Data Integration," Department of Computer Science, Paper ID: 222, pp. 1-16 (2001).
Vincent Coppola, "Killer App," Men's Journal, vol. 12, No. 3, Apr. 2003, pp. 86-90.
Eike Schallehn et al., "Extensible and Similarity-based Grouping for Data Integration," Department of Computer Science, pp. 1-17 (2002).
Rohit Ananthakrishna et al., "Eliminating Fuzzy Duplicates in Data Warehouses," 12 pages (2002).
Peter Christen et al., "Parallel Computing Techniques for High-Performance Probabilistic Record Linkage," Data Mining Group, Australian National University, Epidemiology and Surveillance Branch, Project web page: http://datamining.anu.edu.au/linkage.html, 2002, pp. 1-11.
Peter Christen et al., "Parallel Computing Techniques for High-Performance Record Linkage (Data Matching)," Data Mining Group, Australian National University, Epidemiology and Surveillance Branch, Project web page: http://datamining.anu.edu.au/linkage.html pp. 1-27 (2002).
Peter Christen et al., "High Performance Computing Techniques for Record Linkage," Data Mining Group, Australian National University, Epidemiology and Surveillance Branch, Project web page: http://datamining.anu.edu.au/linkage.html, pp. 1-14 (2002).
William E. Winkler, "Matching and Record Linkage," U.S. Bureau of the Census, pp. 1-38 (1999).
Peter Christen et al., "High-Performance Computing Techniques for Record Linkage," Data Mining Group, Australian National University, Epidemiology and Surveillance Branch, Project web page: http://datamining.anu.edu.au/linkage.html, pp. 1-11 (2002).
William E. Winkler, "The State of Record Linkage and Current Research Problems," U.S. Bureau of the Census, 15 pages. (1999).
William E. Winkler, "Advanced Methods for Record Linkage," Bureau of the Census, pp. 1-21 (1994).
William E. Winkler, "Frequency-Based Matching in Fellegi-Sunter Model of Record Linkage," Bureau of the Census Statistical Research Division, 14 pages, Oct. 4, 2000.
William E. Winlker, "State of Statistical Data Editing and Current Research Problems," Bureau of the Census Statistical Research Division, 10 pages (1999).
Alan Dumas, "The ETL Market and Sunopsis™ v3 Business Intelligence, Data Warehouse & Datamart Projects," Sunopsis, pp. 1-7 (2002).
Teradata Warehouse Solutions, "Teradata Database Technical Overview," pp. 1-7 (2002).
WhiteCross White Paper, "wxdes-Technical Information," pp. 1-36, May 25, 2000.
Teradata Alliance Solutions, "Teradata and Ab Initio," pp. 1-2 (2001).
Peter Christen et al., The Australian National University, "Febrl—Freely extensible biomedical record linkage," pp. 1-67, Oct. 2002.
William E. Winkler, "Using the EM Algorithim for Weight Computation in the Fellegi-Sunter Model of Record Linkage," Bureau of the Census Statistical Research Division, 12 pages, Oct. 4, 2000.
William E. Winkler et al., "An Application of the Fellegi-Sunter Model of Record Linkage to the 1990 U.S. Decennial Census," U.S. Bureau of the Census, pp. 1-22.
William E. Winkler, "Improved Decision Rules in the Fellegi-Sunter Model of Record Linkage," Bureau of the Census, pp. 1-13 (1993).
William E. Winkler, "Record Linkage Software and Methods for Merging Administrative Lists," U.S. Bureau of the Census, Jul. 7, 2001, 11 pages.
TransUnion, Credit Reporting System, 4 pages, <http:www.transunion.comcontentpage.jsp?id=transuniongeneraldatabusinessBusCre . . . > Oct. 9, 2002.
TransUnion, ID Verification & Fraud Detection, Account Acquisition, Account Management, Collection & Location Services, Employment Screening, Risk Management, Automotive, Banking-Savings & Loan, Credit Card Providers, Credit Unions, Energy & Utilities, Healthcare, Insurance, Investment, Real Estate, Telecommunications, 46 pages, <http:www.transunion.com> Oct. 9, 2002.
Examination Report Under Section 18(3) dated Aug. 12, 2011 for Great Britain Application No. GB1021466.6.
Rizzuto, Jan. 13, 2000 Associative Memory retrieved Mar. 4, 2012 from http://pdn.sciencedirect.com/science?_ob=MiamiImageURL&_cid=271597&_user=2502287&_pii=S092523120000268X&_check=y&_origin=article&_zone=toolbar&_coverDate=30-Jun-2000&view=c&originContentFamily=serial&wchp=dGLzVIV-zSkzS&md5=fd1afc38797dff1dfbdd4b59cdd210cb/1-s2.0-S092523120000268X-main.pdf.
The First Open ETL-EAI Software For the Real-Time Enterprise, Sunopsis, A New Generation ETL Tool, "Sunopsis TM v3 expedites integration between homogeneous systems for Data WAREHOUSE, Data Mining, Business Intelligence, and OLAP projects," <www.sunopsis.com>, Sep. 16, 2002.
Scheuren, F. and Winkler, W. E. (1996). Recursive Merging and Analysis of Administrative Lists and Data, Proceedings of the Section of Government Statistics, American Statistical Association, 123-128, 1996.
Enterprises, Publishing and Broadcasting Limited, Acxiom-Abilitec, pp. 44-45, Concise Annual Report, 2001.
"An introduction to OLAP, Multidimensional Terminology and Technology." Pilot White Paper, 1999.
Associative Symmetry vs. Independent Associations, Rizzuto et al. Neurocomputing, vols. 32-33, Jun. 2000, pp. 973-978. (Preprint submitted to Elsevier Preprint Oct. 17, 1999).

* cited by examiner

INTERNAL LINKING CO-CONVERGENCE USING CLUSTERING WITH HIERARCHY

CROSS REFERENCE TO RELATED APPLICATIONS

This application is related to U.S. Pat. No. 8,316,047 filed on Apr. 24, 2009, entitled: "Adaptive Clustering of Records and Entity Representations." This application is a continuation of U.S. patent application Ser. No. 13/648,709, (now U.S. Pat. No. 8,676,838) filed Oct. 10, 2012, entitled "Adaptive Clustering of Records and Entity Representations." This application is also a continuation-in-part of U.S. Patent Publication 20100094910, entitled "Method and System for Linking and Delinking Data Records," filed on Dec. 14, 2009. The contents of these documents are hereby incorporated by reference in their entirety as if set forth in full.

BACKGROUND

One of the most difficult and complex tasks in a data processing environment involves the data integration process of accurately matching, linking, and/or clustering records from multiple data sources that refer to a person, a business, a hierarchical structure or other entity. The task of data integration often becomes more difficult as the amount of collected data grows. This issue, also known as the "Big Data" problem tends to limit the capability of organizations to process and use their data effectively and it makes the record linkage process even more challenging.

Certain forms of data can be used to represent a hierarchy. A hierarchy is a general term that can be used to describe an arrangement of entities at various levels within a given structure. A hierarchy may be utilized to describe many types of phenomena, organizations, structures, processes, etc. For example, a business may be represented by an organization chart in which the various levels of the business may be defined by functions, seniority, locations, direct reports, etc. A chief executive officer, for example, may report to a board of directors at the top of a hierarchy, and managers may report to the chief executive officer, and so forth. Thus, for a given level, there may be related entities above, below, or at the same level. Entities in the hierarchy may be linked vertically and/or horizontally. Certain links between the entities may be direct, indirect, or non-existent.

In hierarchical structures, it is often the relationships and connections between the various entities in a hierarchy that allow one to understand the structure and make determinations about how a particular entity fits into the structure. For example, critical information may be missing with regard to an entire branch of a hierarchy if a single parent/child relationship in the hierarchy is missing or unknown.

The data in a hierarchy can be organized according to various structures. For example, a simple tree structure may include parent/child relationships in which each parent can have many children but each child only has one parent. More complex structures may exist within certain hierarchy structures that allow parents to have multiple children, and children to have connections with multiple parents. Even more complex structures may allow for direct or indirect connections between entities on the same or different levels. Yet other data structures may exist where it is desired to determine relationships among the data where no implicit hierarchy structure exists within the data.

SUMMARY

Some or all of the above needs may be addressed by certain implementations of the disclosed technology. Certain implementations may include systems and methods for linking entities in an internal database (where all data is available) by utilizing co-convergence and clustering. Certain methods disclosed may allow relationships to be determined when there is a hierarchy structure that is known. Other methods disclosed may allow hierarchy relationships to be determined when there is a hierarchy structure in the data, but the hierarchy structure is unknown.

According to an example implementation, a method is provided. The method may include clustering hierarchical database records into a first set of clusters having corresponding first cluster identifications (IDs), each hierarchical database record comprising one or more field values, the clustering based at least in part on determining similarity among corresponding field values of the hierarchical database records; determining parent-child hierarchical relationships among the hierarchical database records; associating related hierarchical database records by applying a hierarchal directional linking process, the hierarchal directional linking process comprising selecting and applying at least an upward process based on the determined parent-child hierarchical relationship wherein the upward process comprises: determining, from the parent-child hierarchical relationships, similarity among a plurality of child records having separate parent records; and in response to determining a threshold similarity among that the plurality of child records, inferring that the separate parent records correspond to the same entity; re-clustering at least a portion of the database records into a second set of clusters having corresponding second cluster IDs, the re-clustering based at least in part on the associating related hierarchical database records and on the determining similarity among corresponding field values of the database records; and outputting database record information, based at least in part on the re-clustering.

According to another example implementation, another method is provided. The method includes clustering hierarchical database records into a first set of clusters having corresponding first cluster identifications (IDs), each hierarchical database record comprising one or more field values, the clustering based at least in part on determining similarity among corresponding field values of the hierarchical database records; receiving parent-child hierarchical relationship information for the hierarchical database records; re-clustering at least a portion of the hierarchical database records into a second set of clusters having corresponding second cluster IDs, the re-clustering based at least in part on the received parent-child hierarchical relationship information; and outputting hierarchical database record information, based at least in part on the re-clustering.

According to another example implementation, a system is provided. The system includes at least one memory for storing data and computer-executable instructions; and at least one processor configured to access the at least one memory and further configured to execute the computer-executable instructions for: clustering hierarchical database records into a first set of clusters having corresponding first cluster identifications (IDs), each hierarchical database record comprising one or more field values, the clustering based at least in part on determining similarity among corresponding field values of the hierarchical database records. When a hierarchy structure of the hierarchical database records is unavailable, the system is configured for determining parent-child hierarchical relationships among the hierarchical database records; associating related hierarchical database records by applying a hierarchal directional linking process, the hierarchal directional linking process comprising selecting and applying at least an upward process based on the determined parent-child hierarchical relationship wherein the upward process comprises: determining, from the parent-child hierarchical relationships, similarity among a plurality of child records having separate parent records; and in response to determining a threshold similarity among that the plurality of child records, inferring that the separate parent records correspond to the same entity; re-clustering at least a portion of the hierarchical database records into a second set of clusters having corresponding second cluster IDs, the re-clustering based at least in part on the associating related hierarchical database records and on the determining similarity among corresponding field values of the database records. When a hierarchy structure of the hierarchical database records is available, the system is configured for receiving parent-child hierarchical relationship information for the hierarchical database records; re-clustering at least a portion of the hierarchical database records into a second set of clusters having corresponding second cluster IDs, the re-clustering based at least in part on the received parent-child hierarchical relationship information; and outputting hierarchical database record information, based at least in part on the re-clustering.

According to another example implementation a non-transitory computer-readable media is provided. The computer-readable media is capable of storing computer-executable instructions that, when executed by one or more processors, cause the one or more processors to perform a method comprising: clustering hierarchical database records into a first set of clusters having corresponding first cluster identifications (IDs), each hierarchical database record comprising one or more field values, the clustering based at least in part on determining similarity among corresponding field values of the hierarchical database records. When a hierarchy structure of the hierarchical database records is unavailable, the computer-readable media provides instructions for determining parent-child hierarchical relationships among the hierarchical database records; associating related hierarchical database records by applying a hierarchal directional linking process, the hierarchal directional linking process comprising selecting and applying at least an upward process based on the determined parent-child hierarchical relationship wherein the upward process comprises: determining, from the parent-child hierarchical relationships, similarity among a plurality of child records having separate parent records; and in response to determining a threshold similarity among that the plurality of child records, inferring that the separate parent records correspond to the same entity; re-clustering at least a portion of the hierarchical database records into a second set of clusters having corresponding second cluster IDs, the re-clustering based at least in part on the associating related hierarchical database records and on the determining similarity among corresponding field values of the database records. When a hierarchy structure of the hierarchical database records is available. the computer-readable media provides instructions for receiving parent-child hierarchical relationship information for the hierarchical database records; re-clustering at least a portion of the hierarchical database records into a second set of clusters having corresponding second cluster IDs, the re-clustering based at least in part on the received parent-child hierarchical relationship information; and outputting hierarchical database record information, based at least in part on the re-clustering.

Other implementations, features, and aspects of the disclosed technology are described in detail herein and are considered a part of the claimed disclosed technology. Other implementations, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Figure 1A:
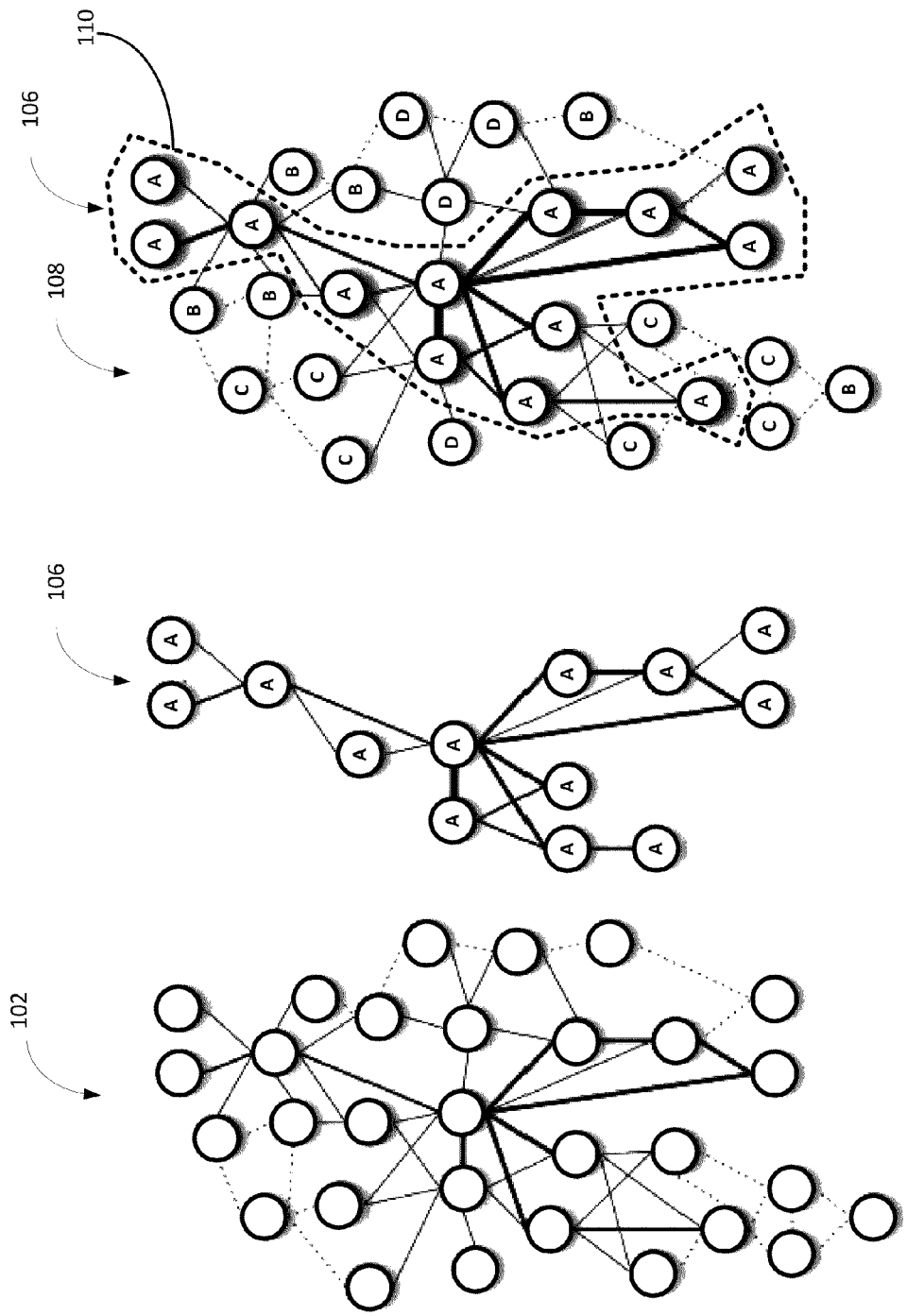
FIG. 1A is a block diagram of an illustrative clustering process, according to an example implementation of the disclosed technology.

Some implementations of the disclosed technology will be described more fully hereinafter with reference to the accompanying drawings. This disclosed technology may, however, be embodied in many different forms and should not be construed as limited to the implementations set forth herein.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected," means that one function, feature, structure, or characteristic is directly joined to or in communication with another function, feature, structure, or characteristic. The term "coupled," means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form.

The various embodiments disclosed herein may apply to a wide variety of applications, including but not limited to data analytics, entity resolution, entity searching, removal of duplicate records, and increasing the speed and accuracy of such applications.

1A. Internal Co-Convergence Using Clustering (with No Hierarchy in the Data Structure)

According to certain example implementations of the disclosed technology, record linking and clustering may involve an internal linking process. In an example implementation of the disclosed technology, internal linking may include (1) determining relationships among available data; (2) computing an aggregate relationship between any two entities; and (3) partitioning the data (and/or the space defined by the data) based upon the relationships.

For example, an internal linking processes may receive or utilize all available information and partition or cluster the data according to different entities and/or relationships among the different entities. In one example implementation, the data may be evaluated for its relationship to a particular entity, and the data may be grouped into a cluster based on certain characteristics or similarities with members of the cluster. In accordance with an example implementation of the disclosed technology, one of the core features of co-convergence is that the cluster sets may represent different entities. In one example implementation, co-convergence may involve two different processes clustering two different entity spaces that are collaborating.

In certain embodiments, a general goal of co-convergence may be to cluster related records, then re-cluster the clusters without ruining the original cluster. Co-convergence may be utilized to understand parts of a structure, but it may be difficult to understand how the parts fit together without knowledge of the structure. In an example implementation, co-convergence may elicit the structure from the relationships of the parts.

Certain examples of co-convergence using clustering may be applied to a single set of data records. Other examples of co-convergence using clustering may be applied to two or more sets of data records. For example, a single record set might include fields such as Name, Address and may be co-converged to elicit people and places. In another example implementation, two completely different record sets may be co-converged at the same time. For example, one set of data may represent people and include fields such as First Name, Last Name, Address, and another set of data may represent businesses and include fields such as Business Name, Address. Certain example implementations of the disclosed technology may allow converging separate entity spaces in sync, where in certain embodiments, the separate entity spaces may be in different record sets.

Figure 1B:
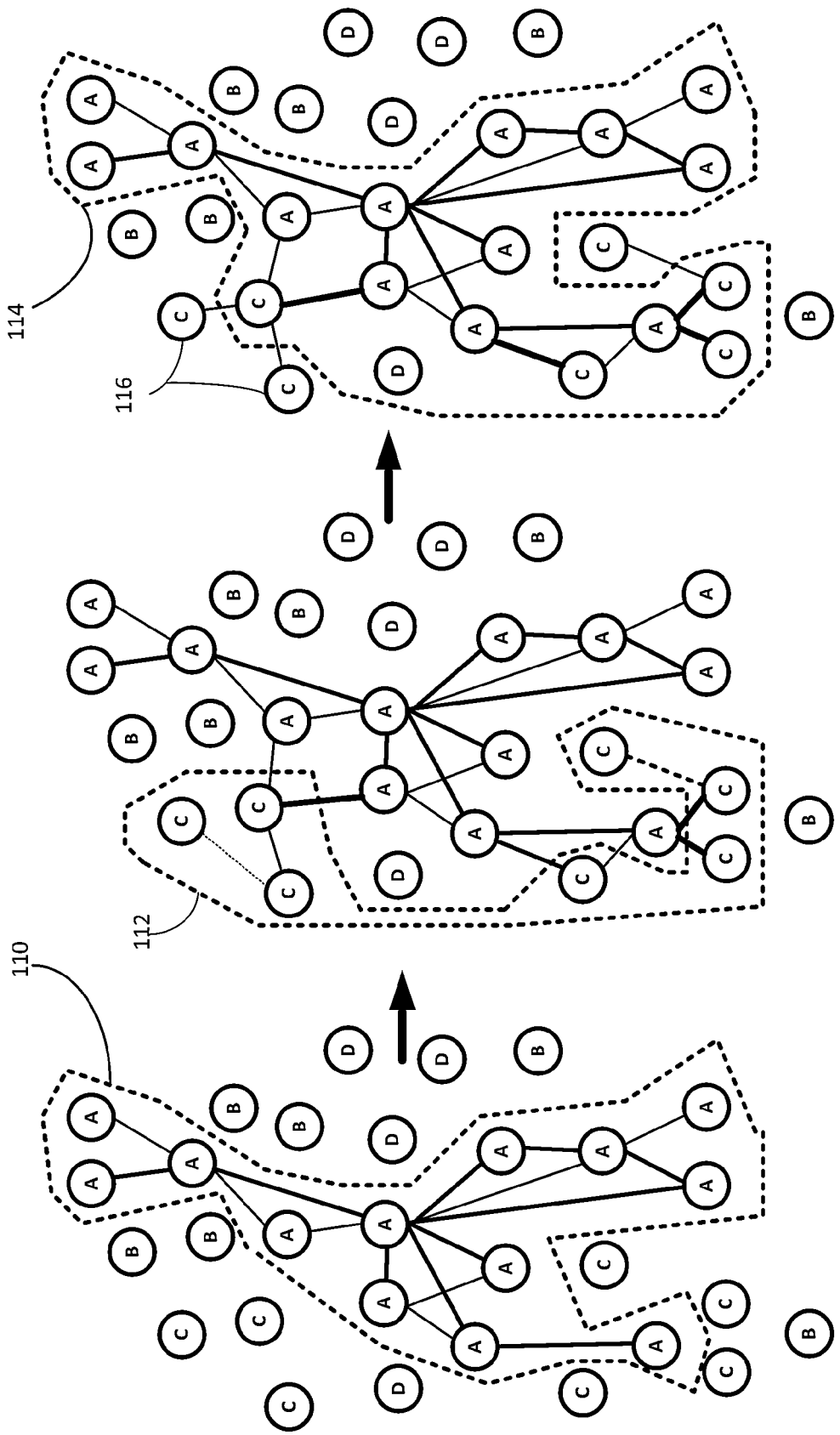
FIG. 1B is a block diagram of a clustering process, according to an example implementation of the disclosed technology.

FIG. 1A and FIG. 1B provide example graphical representations of a clustering and co-convergence process, according to an example implementation of the disclosed technology. FIG. 1A depicts an example initial clustering (with no real co-convergence implied). The circles shown in FIG. 1A may depict available database record representations 102 corresponding to two or more different entities. As indicated above, such records may be in a single record set, or they may be from two or more record sets. Such database record representations 102 may be examined and compared to determine linkages or relationships among the records. The "relationships" among the various records (nodes) may be represented (for illustration purposes) as connecting lines (edges), with line weights representing different types of relationships and/or weightings among field values of the database records.

In certain example embodiments, each of the record data representations 102 may include multiple fields (not shown in FIG. 1A), and may therefore be represented as nodes in a hyperspace. In one example implementation, the record data representations 102 may relate to entities, such as people, and may include fields (such as Last Name, First Name, Address, Social Security Number, etc.,) with corresponding field values (such as Smith, John, 45 Broad Street, 543-21-1111). In another example implementation, the record data representations 102 may represent entities such as an organization, and may include fields such as corporate offices, branches, locations, products, etc., with corresponding field values. In other example embodiments, the record data representations 102 may include data representations from two or more different record sets. For example, and as previously discussed, the data may include representations from one set of records that represent people (with fields such as Last Name, First Name, Address, Social Security Number, etc.,) and the data may include representations from another set of records that represent businesses (with fields such as corporate offices, branches, locations, products, etc.).

According to certain example implementations, each available record data representation 102 may correspond to an entity representation and may include a plurality of fields, each field configured to contain a field value, and each field value assigned a field value weight corresponding to a specificity of the field value in relation to all field values in a corresponding field of the records.

In accordance with an example implementation, for any particular given record attribute, the general process of clustering records may be refined with each iteration by assuming that all the other records and relationships are correct, performing one clustering iteration, then moving on to the next record attribute, performing one clustering iteration, and so forth. For example, referring again to FIG. 1A, the record data representations 102 may be evaluated with respect to a particular attribute and a cluster of records may be identified as having certain quantitative or qualitative relationships to the particular attribute of interest.

An example of an initial cluster 106 is depicted in FIG. 1. The same initial cluster 106 is shown contained within a dotted outline 110 to distinguish the members of the cluster from the remaining records 108. The initial clustered records 106, as depicted in this example, are shown sharing a common attribute identifier: "A," along with connection weights that may represent any number of scenarios, according to certain example embodiments of the disclosed technology. For example, the "A" identifier and the connecting edges may represent certain commonalities with respect to the identifier evaluated in the clustering iteration (such as exact or partial matches of a last name).

FIG. 1B depicts another graphical example of an additional first iteration clustering 112 of record data representations 102 in the data set(s) having an attribute identifier depicted as "C." FIG. 1B also depicts a re-clustering iteration process, according to an example implementation of the disclosed technology, in which a new cluster 114 is formed having records identified with both "A" and "C" attributes. To arrive at the new cluster 114 (and not explicitly shown in FIG. 1B), example embodiments may utilize a first iteration process whereby records with "A" attributes are clustered while noting relationships (edges and weights, for example) between those records having "C" attributes, and vice-versa. For example, starting with the initial cluster 110, attributes or commonalities (represented by connecting edges) may be evaluated to aggregate one or more relationships between any two entities. As depicted in FIG. 1B, and based on relationships and/or other criteria among the records, the new cluster 114 formed in the re-clustering step may include certain records of the first iteration clusters 110 112 while omitting certain records 116.

In general terms, and in accordance with an example implementation, the available records 102 (as shown in FIG. 1A) may be initially clustered into a first set of clusters having corresponding first cluster identifications (IDs), and each record may include one or more field values. For example, records may be clustered according to the various identifications, such as "A," "B," "C," "D," etc., as indicated in FIG. 1A. In accordance with an example implementation, and as discussed above with respect to FIGS. 1A and 1B, the initial clustering iteration(s) may be based at least in part on determining similarity among corresponding field values of database records. In an example implementation, mutually matching records may be associated by performing at least one matching iteration for each of the records 102, based at least in part on the cluster IDs. In an example implementation, the matching iteration may include linking related database records based at least in part on a determined match value. In another example implementation, the matching iteration may include linking related database records, based at least in part on determined mutually preferred records. In an example implementation, the clustering may include a process of determining similarity among corresponding field values of the database records.

According to an example implementation of the disclosed technology, the iteration process may include re-clustering at least a portion of the database records into a second set of clusters (for example, the cluster 114 shown in FIG. 1B) having a corresponding second cluster ID. In an example implementation, the re-clustering may be based, at least in part, on associating mutually matching attributes of the initial clusters. In another example implementation, the re-clustering may be based, at least in part, on determining similarity among corresponding field values of the database records.

In one example implementation, the initial clustering may include associating mutually matching database records, which may include determining highest compelling linkages among the database records, which may further include identifying mutually preferred pairs of records from the database records, each mutually preferred pair of records consisting of a first record and a second record, the first record consisting of a preferred record associated with the second record and the second record consisting of a preferred record associated with the first record. In an example implementation, the mutually preferred pairs of records may be assigned a match score that meets pre-specified match criteria.

In an example implementation, the iteration process may also include assigning, for each record from the database records, at least one associated preferred record, wherein a match value assigned to a given record together with its associated preferred record is at least as great as a match value assigned to the record together with any other record in the database records. In an example implementation, the iteration process may also include forming and storing a plurality of entity representations in the database, each entity representation of the plurality of entity representations including at least one linked pair of mutually preferred records.

According to an example implementation of the disclosed technology, determining similarity among the corresponding field values of the records 102 may include assigning a hyperspace attribute to each record 102. The hyperspace attribute that corresponds to two database records may correlate with a similarity of the corresponding field values of the two database records. In certain example embodiments, membership of each database record in a plurality of hyperspace clusters may be determined based at least in part on the hyperspace attributes. According to an example implementation each record 102 may be assigned a cluster ID and a match value reflecting a likelihood that the record is a member of a particular hyperspace cluster, and related records may be linked based at least in part on the cluster ID and match value (as depicted by the edges joining the nodes in FIG. 1A). Determining membership of each database record in the plurality of hyperspace clusters, for example, may include creating a plurality of nodes at random locations in hyperspace, each node maintaining records in hyperspace based on the hyperspace attribute for which it is the closest node.

In accordance with certain implementations of the disclosed technology duplicate records (for example, ones that are likely to represent the same entity) may be eliminated by merging those database records that have hyperspace attribute differences within a predefined criteria, resulting in a reduced set of database records. In accordance with an example implementation, the process may further include recalculating the field value weights for the reduced set of database records, and re-clustering the reduced set of records based at least in part on the recalculated field value weights.

According to an example implementation, of the disclosed technology, the clustering, iterating, recalculating, and re-clustering etc. may produce a set of refined clusters in which the records in a given set possess criteria that resemble the other records in the set. Such clustering may provide useful characteristics, categories, structures, etc., for understanding the interrelations among records in a database, and may further be used to define characteristics, categories, structures, etc., for new data as it becomes available. Additional support and descriptions of the disclosed technology may be found in U.S. Pat. No. 8,316,047, incorporated herein by reference.

Figure 6:
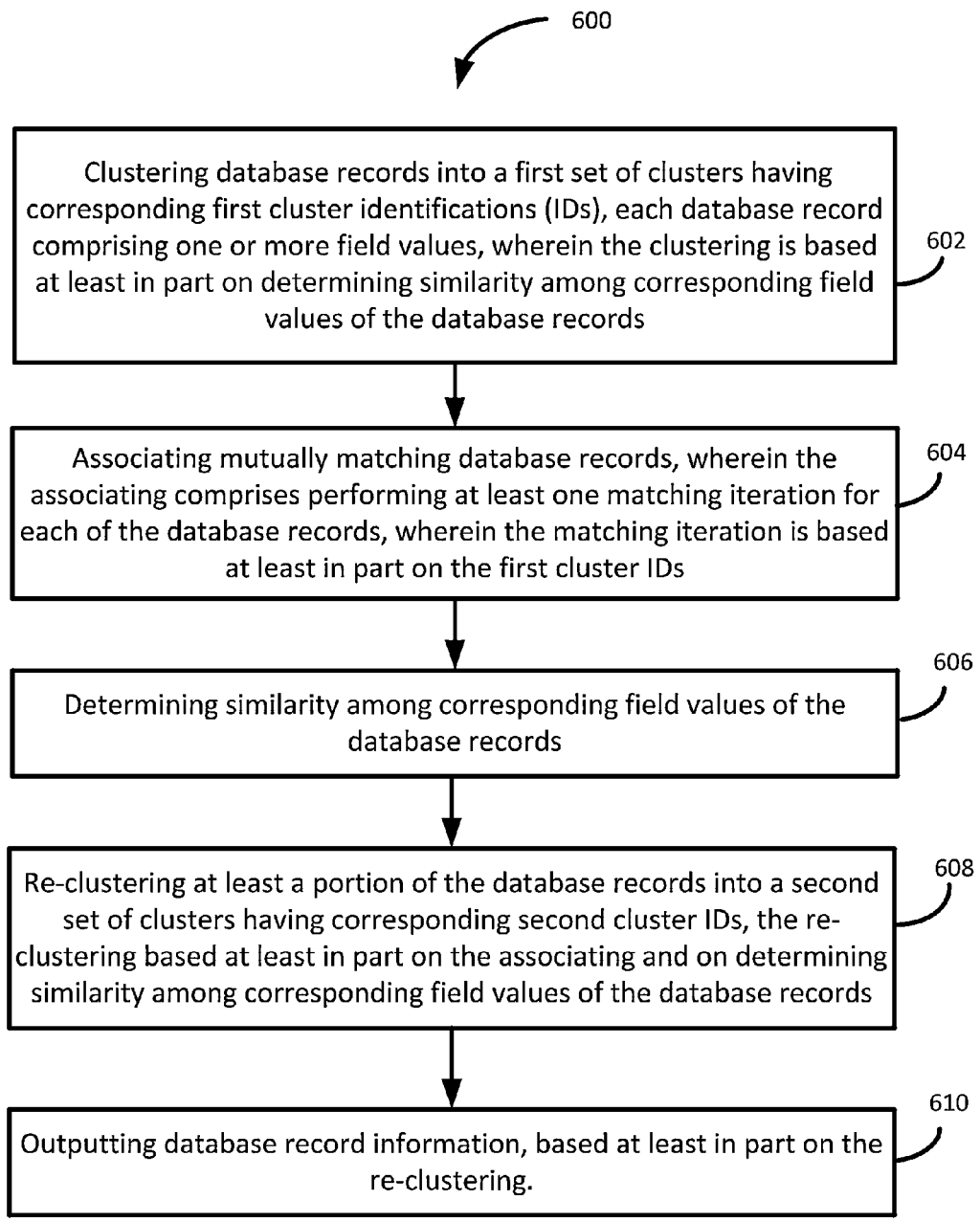
FIG. 6 is a flow diagram of a method according to an example implementation of the disclosed technology.

An example method 600, that may be utilized for providing internal co-convergence using clustering with no hierarchy in the data structure, will now be described with reference to the flowchart of FIG. 6. The method 600 starts in block 602, and according to an example implementation includes clustering database records into a first set of clusters having corresponding first cluster identifications (IDs), each database record including one or more field values, wherein the clustering is based at least in part on determining similarity among corresponding field values of the database records. In block 604, the method 600 includes associating mutually matching database records, wherein the associating includes performing at least one matching iteration for each of the database records, wherein the matching iteration is based at least in part on the first cluster IDs. In block 606, the method 600 includes determining similarity among corresponding field values of the database records. In block 608, the method 600 includes re-clustering at least a portion of the database records into a second set of clusters having corresponding second cluster IDs, the re-clustering based at least in part on the associating mutually matching database records and on the determining similarity among corresponding field values of the database records. In block 610, the method 600 includes outputting database record information, based at least in part on the re-clustering.

In certain example implementations of the disclosed technology, determining similarity among the corresponding field values of the database records may include assigning a hyperspace attribute to each database record, wherein the hyperspace attribute corresponding to two database records is correlated with a similarity of the corresponding field values of the two database records; determining membership of each database record in a plurality of hyperspace clusters based at least in part on the hyperspace attributes; assigning, to each record, a cluster ID and a match value reflecting a likelihood that the record is a member of a particular hyperspace cluster; and linking related records based at least in part on the cluster ID and match value.

Certain example implementations may include merging database records having hyperspace attribute differences within a predefined criteria to eliminate similar exemplars that are likely to represent a same entity, the merging resulting in a reduced set of database records. An example embodiment may include recalculating the field value weights for the reduced set of database records and re-clustering the reduced set of records based at least in part on the recalculated field value weights.

In certain example implementations of the disclosed technology, determining membership of each database record in the plurality of hyperspace clusters may further include creating a plurality of nodes at random locations in hyperspace, each node maintaining records in hyperspace based on the hyperspace attribute for which it is the closest node.

In accordance with an example implementation, associating mutually matching database records may further include determining highest compelling linkages among the database records. In certain example embodiments, the determining may include identifying mutually preferred pairs of records from the database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria. In certain example embodiments, the determining may include assigning, for each record from the database records, at least one associated preferred record, wherein a match value assigned to a given record together with its associated preferred record is at least as great as a match value assigned to the record together with any other record in the database records. In certain example embodiments, the determining may include forming and storing a plurality of entity representations in the database, each entity representation of the plurality of entity representations comprising at least one linked pair of mutually preferred records.

According to an example implementation, each database record may corresponds to an entity representation, each database record comprising a plurality of fields, each field configured to contain a field value, and each field value assigned a field value weight corresponding to a specificity of the field value in relation to all field values in a corresponding field of the records.

In an example implementation, performing the at least one matching iteration may include linking related database records based at least in part on a determined match value or determined mutually preferred records.

1B. Internal Co-Convergence Using Clustering (with Hierarchy in the Data Structure)

Figure 2A:
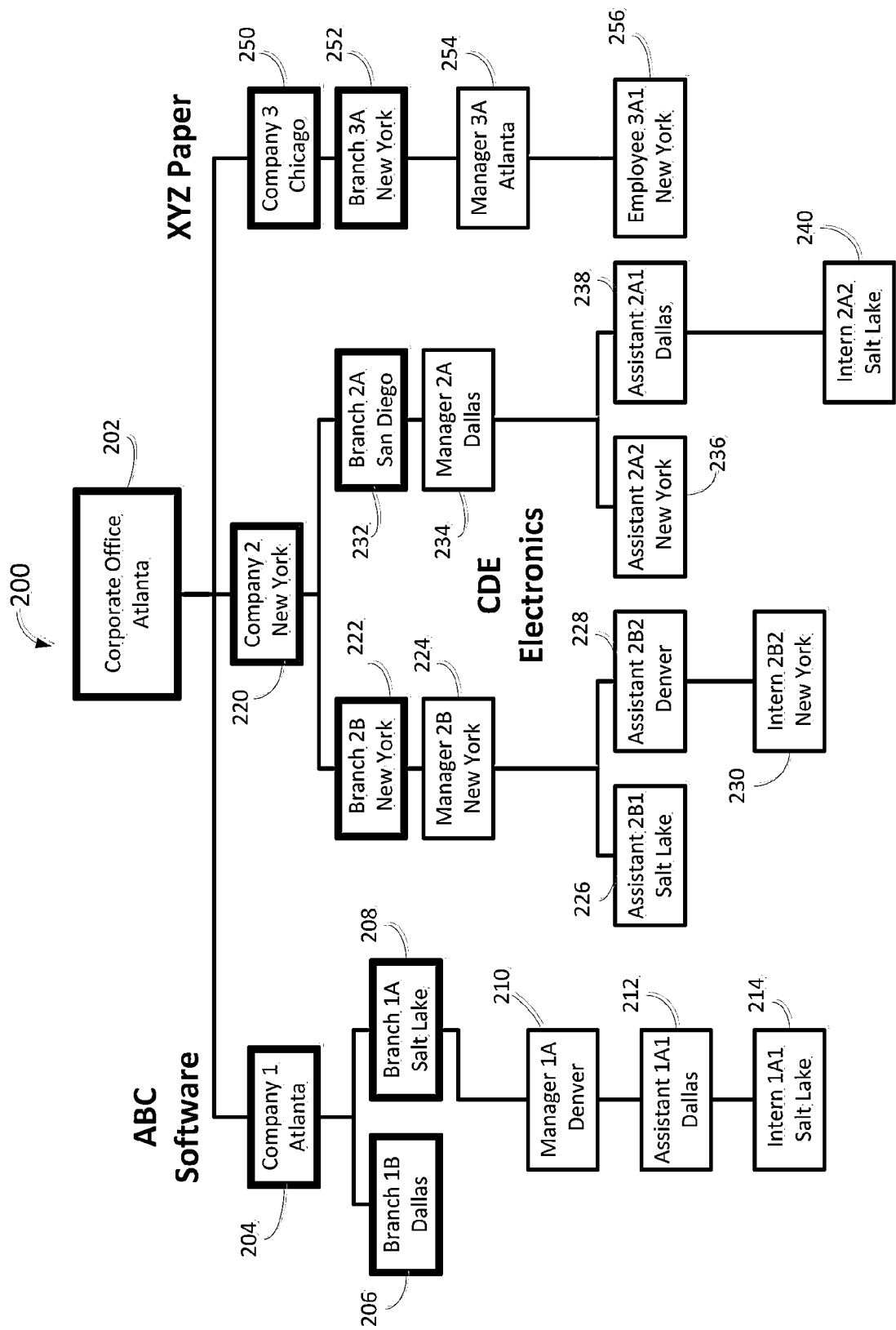
FIG. 2A is a block diagram of an illustrative tree-type organization chart according to an example embodiment of the disclosed technology.

FIG. 2A depicts a hypothetical tree-type organization chart 200 that may be utilized to illustrate a process of internal co-convergence when there is a hierarchy in the data structure, according to an example embodiment of the disclosed technology. The various related entities of the hypothetical organization are also tabulated in Table 1 with the associated reference numerals indicated in the left hand column.

TABLE 1

(See FIG. 2A)

| Ref. # | ID | Direct Report | City | Product |
|---|---|---|---|---|
| 202 | Corp. Office | | New York | ABC, CDE, XYZ |
| 204 | Company 1 | Corp. Office | Atlanta | ABC Software |
| 220 | Company 2 | Corp. Office | New York | CDE Electronics |
| 250 | Company 3 | Corp. Office | Chicago | XYZ Paper |
| 208 | Branch 1A | Company 1 | Salt Lake | ABC Software |
| 206 | Branch 1B | Company 1 | Dallas | ABC Software |
| 232 | Branch 2A | Company 2 | San Diego | CDE Electronics |
| 222 | Branch 2B | Company 2 | New York | CDE Electronics |
| 252 | Branch 3A | Company 3 | New York | XYZ Paper |
| 210 | Manager 1A | Branch 1A | Denver | ABC Software |
| 234 | Manager 2A | Branch 2A | Dallas | CDE Electronics |
| 224 | Manager 2B | Branch 2B | New York | CDE Electronics |
| 254 | Manager 3A | Branch 3A | Atlanta | XYZ Paper |
| 212 | Assistant 1A1 | Manager 1A | Dallas | ABC Software |
| 238 | Assistant 2A1 | Manager 2A | Dallas | CDE Electronics |
| 236 | Assistant 2A2 | Manager 2A | New York | CDE Electronics |
| 226 | Assistant 2B1 | Manager 2B | Salt Lake | CDE Electronics |
| 228 | Assistant 2B2 | Manager 2B | Denver | CDE Electronics |
| 256 | Employee 3A1 | Manager 3A | New York | XYZ Paper |
| 214 | Intern 1A1 | Assistant 1A1 | Salt Lake | ABC Software |
| 240 | Intern 2A2 | Assistant 2A1 | Salt Lake | CDE Electronics |
| 230 | Intern 2B2 | Assistant 2B2 | New York | CDE Electronics |

As indicated in FIG. 2A, the hypothetical organization includes a corporate office 202 having three branches: "Company 1" 204, "Company 2", 220, and "Company 3" 250, with respective hypothetical product lines of ABC software, CDE electronics, and XYZ paper. Each company in the hypothetical organization also includes branch offices, as indicated in the chart 200 of FIG. 2A and in Table 1. The organization chart 200 also includes people, such as managers, assistants, interns, and employees, with respective levels and position in the organization hierarchy structure. The information shown in Table 1 could be utilized to reproduce a chart (similar to that of chart 200) based on the "direct report" relationships in the hierarchy.

The information shown in FIG. 2A (and tabulated in Table 1) may represent a complete and accurate picture of the hypothetical organization. However, in certain cases, limited or incomplete data may be available, without the benefit of knowing the hierarchical structure or interrelation among the entities. Embodiments of the disclosed technology may be utilized to piece-together, approximate, or at least partially determine the organizational structure based on incomplete data. Embodiments of the disclosed technology may be utilized to refine approximated hierarchical relationships, as new information becomes available.

Figure 2B:
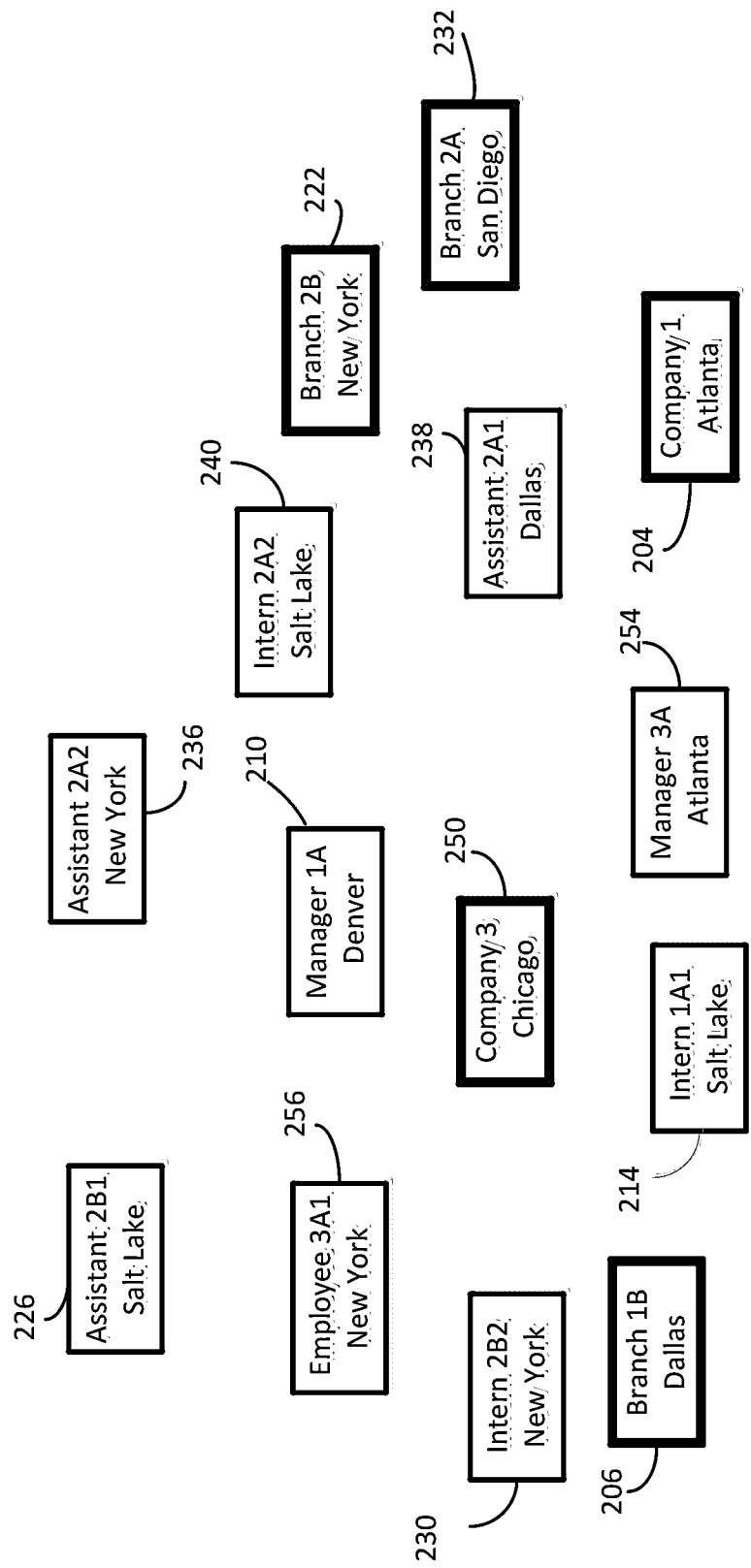
FIG. 2B is a block diagram depicting an illustrative entities in an organization, where the hierarchy structure is not available and the data is incomplete.

FIG. 2B depicts illustrative entities in an organization, where the hierarchy structure is not yet available and the data may be incomplete (or only partially utilized). The entities shown in FIG. 2B are also tabulated in Table 2, with the reference numerals indicated in the left hand column. This information represents a typical situation where it may be desired to determine one or more relationships in the organizational structure based on limited information. In certain embodiments, the available information (for example, as depicted in FIG. 2B) may be insufficient to gain any further insights into the structure of the organization due to the lack of parent-child-sibling linking information in the data. In the case of FIG. 2B (and Table 2), the inability to connect entities is further exacerbated by the different city location of the companies, branches, managers, etc., and additional information may be needed to derive connections among the entities.

As an illustrative example, and based on the available information tabulated in Table 2, a logical assumption may be to link the Manager 3A 253 with Company 1 204 based on the common city designation. However, according to the actual hierarchy relationships shown in FIG. 2A, Manager 3A 253 is actually linked with Company 3 250 via Branch 3A 252. As will be illustrated below, initial linkages that are based on limited information may be revised as additional information becomes available and is utilized in the process of determining the hierarchy structure and relationships among the entities in the hierarchy.

TABLE 2

(See FIG. 2B)

| Ref. # | ID | City |
|---|---|---|
| 204 | Company 1 | Atlanta |
| 250 | Company 3 | Chicago |
| 206 | Branch 1B | Dallas |
| 232 | Branch 2A | San Diego |
| 222 | Branch 2B | New York |
| 210 | Manager 1A | Denver |
| 254 | Manager 3A | Atlanta |
| 238 | Assistant 2A1 | Dallas |
| 236 | Assistant 2A2 | New York |
| 226 | Assistant 2B1 | Salt Lake |
| 256 | Employee 3A1 | New York |
| 214 | Intern 1A1 | Salt Lake |
| 240 | Intern 2A2 | Salt Lake |
| 230 | Intern 2B2 | New York |

Figure 2C:
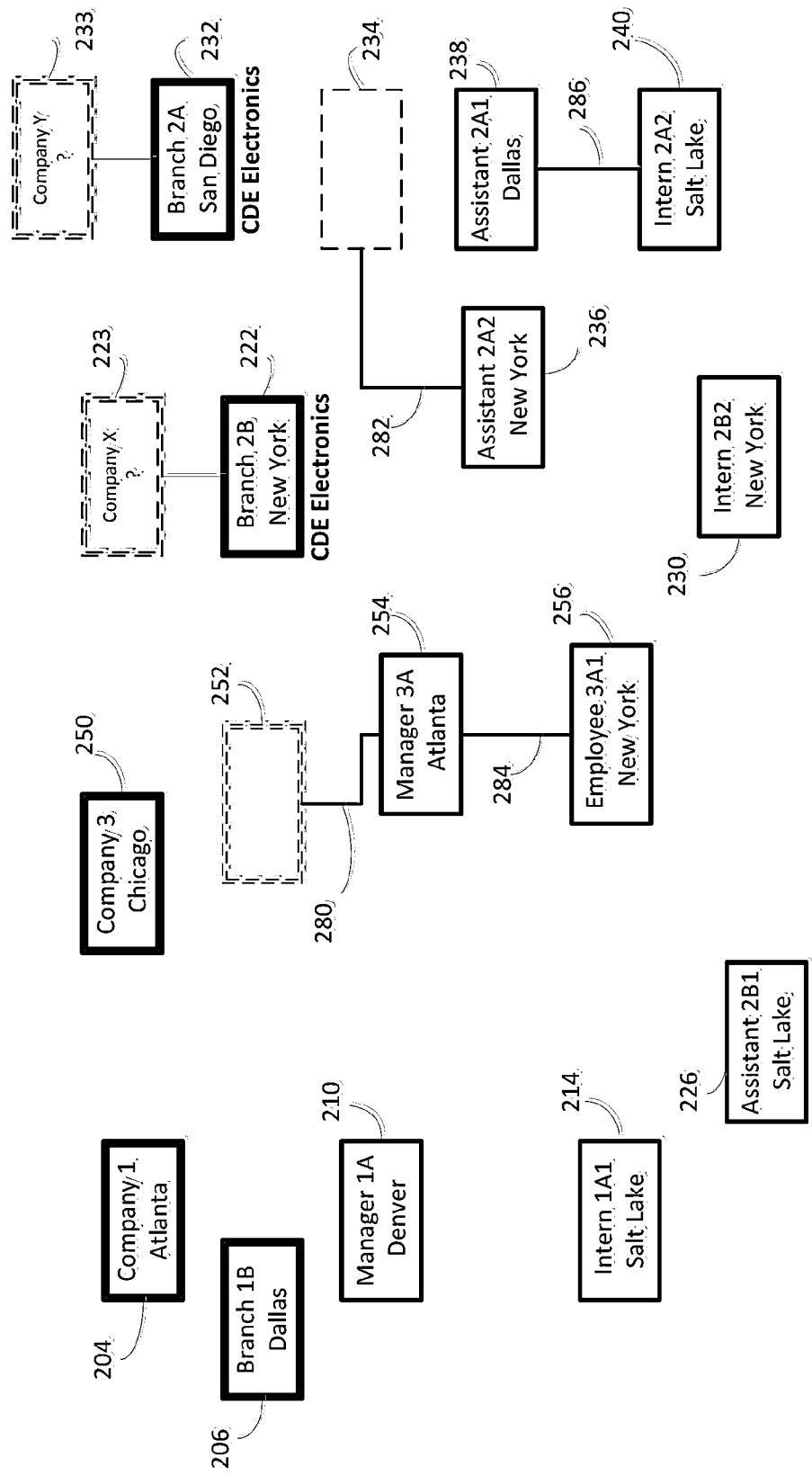
FIG. 2C is a block diagram depicting illustrative entities (as included in FIG. 2A), where the hierarchy structure is partially known or determined, according to an example implementation of the disclosed technology.

FIG. 2C depicts illustrative entities in the hypothetical organization (as included in FIG. 2A), where the information is still incomplete, but the available "direct report" information is utilized to fill-in some of the hierarchical structure. The entities shown in FIG. 2C are tabulated in Table 3, with the reference numerals indicated in the left hand column. It should be emphasized that this example is for illustration purposes and to further provide a foundation for further explanation of certain implementations of the disclosed technology.

Based on the available and/or utilized information about the hypothetical organization, and as depicted in FIG. 2C and Table 3, certain connections among the entities may be directly determined or assumed, and a slightly more detailed view of the organization may be revealed. For example, the data in Table 3 indicates that "Manager 3A" 254, in Atlanta, is shown as a direct report to "Branch 3A," and thus a parent-child connection 280 may be drawn connecting "Manager 3A" 254, and a (yet unknown) parent entity 252. In this case, the actual entity representation identification (ID) for "Branch 3A" is missing from the data, but since it is included as a direct report for "Manager 3A" 254, it may be assumed that this parent entity 254 may be "*Branch 3A" 252 (and the "*" symbol may designate an assumed or derived value based on the given direct report information. A similar process may be utilized to fill-in the known or assumed hierarchical connections 282, 284, 286 and additional (yet unknown) entities 234, 252 according to an example implementation of the disclosed technology.

TABLE 3

(See FIG. 2C)

| Ref # | ID | Direct Report | City | Product |
|---|---|---|---|---|
| 204 | Company 1 | | Atlanta | |
| 250 | Company 3 | | Chicago | |
| 223 | Company X? | | | |
| 233 | Company Y? | | | |
| 206 | Branch 1B | | Dallas | |
| 232 | Branch 2A | Company Y? | San Diego | CDE Electronics |
| 222 | Branch 2B | Company X? | New York | CDE Electronics |
| 210 | Manager 1A | | Denver | |
| 252 | ? | | | |
| 254 | Manager 3A | Branch 3A | Atlanta | |
| 238 | Assistant 2A1 | | Dallas | |
| 236 | Assistant 2A2 | Manager 2A | New York | |
| 226 | Assistant 2B1 | | Salt Lake | |
| 256 | Employee 3A1 | Manager 3A | New York | |
| 234 | ? | | | |
| 214 | Intern 1A1 | | Salt Lake | |
| 240 | Intern 2A2 | Assistant 2A1 | Salt Lake | |
| 230 | Intern 2B2 | | New York | |

Figure 2D:
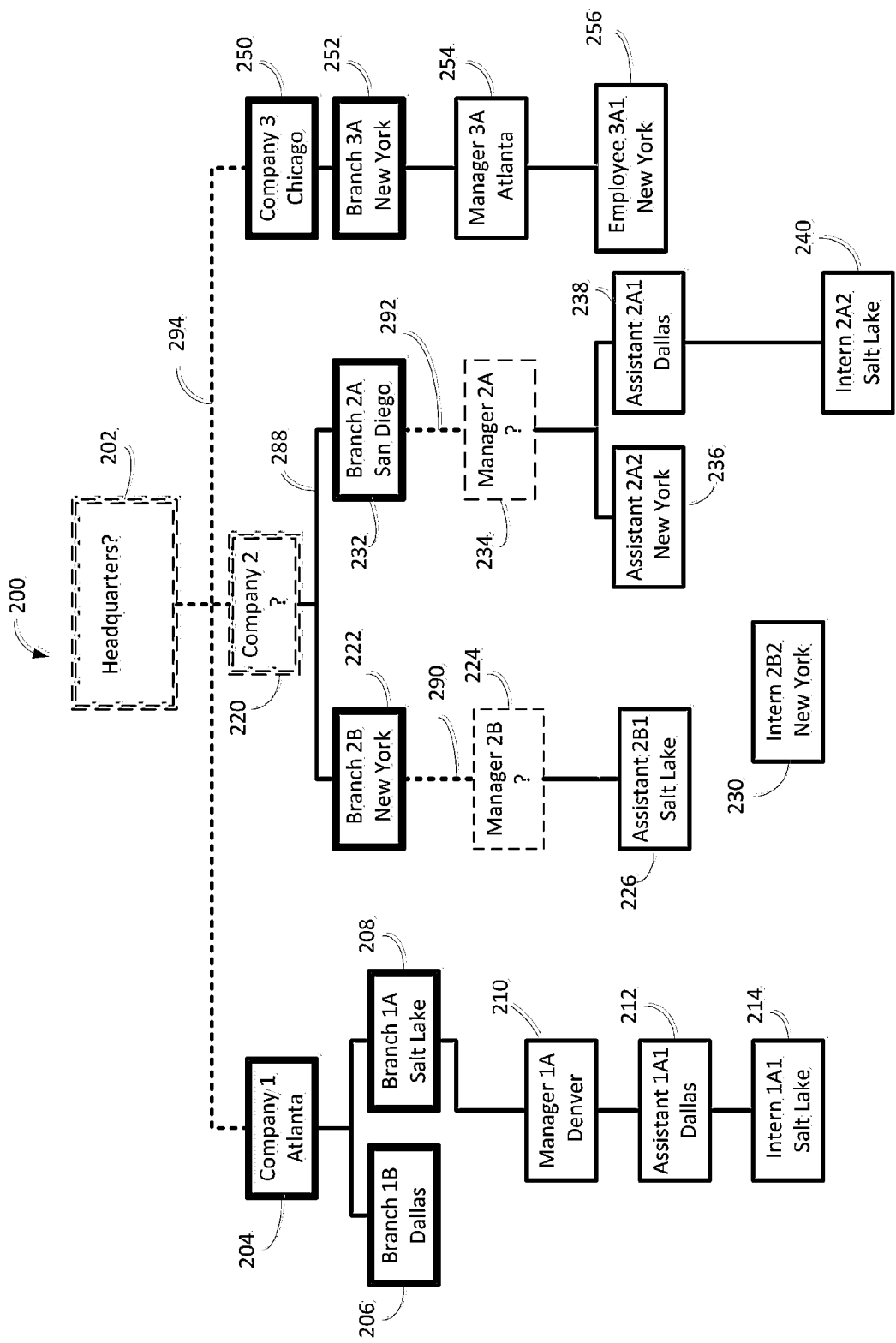
FIG. 2D is another block diagram depicting illustrative entities (as included in FIG. 2A), where the hierarchy structure is partially known or determined, according to an example implementation of the disclosed technology.

FIG. 2D depicts illustrative entities in the hypothetical organization (as included in FIG. 2A), where the information is still incomplete, but additional information may become available and/or may be utilized to fill-in additional hierarchical structure. The entities shown in FIG. 2D are also tabulated in Table 4, with the reference numerals indicated in the left hand column.

Based on the newly available (and/or newly utilized) information about the hypothetical organization, and as depicted in FIG. 2D and Table 4, certain additional connections among the entities may be directly determined or assumed, and a more detailed view of the organization may be revealed. In this example, the data shown in Table 4 shows the information from Table 3, but now includes a new entry of "Branch 1A" 208, in Salt Lake that reports directly to "Company 1" 204. Furthermore, the new data includes "Assistant 1A1" 212 in Dallas, who reports to "Manager 1A" 210 in Denver, who reports to "Branch 1A" 208 in Salt Lake. Based on this additional information, a more complete hierarchy structure below "Company 1" 204 may now be realized.

In this example, the new data also provides parent-child linking information that indicates that "Branch 2B" 222 in New York reports to some "Company X?" 223, and that "Branch 2A" 232 in San Diego report to some "Company Y?" 233. The illustrative information shown in Table 3 also indicates that the entities "Branch 2B" 222 "Branch 2A" 232 are involved with a common product "CDE Electronics." Based on this (and possibly other) compelling information, and according to an example implementation of the disclosed technology, it may be inferred that the parent entities "Company X?" 223 and "Company Y?" 233 are in fact, the same entity. This example of associating related hierarchical database records by applying a hierarchal directional linking process is illustrated in FIG. 2D and Table 4, with a placeholder for this new entity "Company 2?" 220 that is a reduction of the separate entities "Company X?" 223 and "Company Y?" 233 and referred in relation to the linking relationships 288 from "Branch 2B" 222 in New York and "Branch 2A" 232 in San Diego.

TABLE 4

(See FIG. 2D)

| Ref # | ID | Direct Report | City |
|---|---|---|---|
| 202 | Headquarters? | | |
| 204 | Company 1 | | Atlanta |
| 220 | Company 2? | | |
| 250 | Company 3 | | Chicago |
| 208 | Branch 1A | Company 1 | Salt Lake |
| 206 | Branch 1B | Company 1 | Dallas |
| 232 | Branch 2A | Company 2 | San Diego |
| 222 | Branch 2B | Company 2 | New York |
| 252 | Branch 3A | Company 3 | New York |
| 210 | Manager 1A | Branch 1A | Denver |
| 234 | Manager 2A? | | |
| 224 | Manager 2B? | | |
| 254 | Manager 3A | Branch 3A | Atlanta |
| 212 | Assistant 1A1 | Manager 1A | Dallas |
| 238 | Assistant 2A1 | Manager 2A | Dallas |
| 236 | Assistant 2A2 | Manager 2A | New York |
| 226 | Assistant 2B1 | Manager 2B | Salt Lake |
| 228 | Assistant 2B2 | Manager 2B | Denver |
| 256 | Employee 3A1 | Manager 3A | New York |
| 214 | Intern 1A1 | Assistant 1A1 | Salt Lake |
| 240 | Intern 2A2 | Assistant 2A1 | Salt Lake |
| 230 | Intern 2B2 | Assistant 2B2 | New York |

As indicated in FIG. 2D and in Table 4, new data (or newly utilized data) may provide information regarding previous unknown entities such as "Branch 3A" 252 in New York that reports to "Company 3" 250. With this example, one may be able to better appreciate how such data may be utilized to help fill-in, connect, and make sense out of a hierarchy structure. For example, a single piece of data may allow an entire branch of a hierarchy to be completed, such as in the case with the previously unknown entity 252. The new data may allow populating and connecting not only "Branch 3A" 252 as a child relationship with "Company 3" 250, but it may further provide defining information for all of the child relationships under "Branch 3A" 252. In other words, knowing that "Branch 3A" 252 in New York that reports to "Company 3" 250 also would indicate that "Manager 3A" 254 and "Employee 3A1" 256 are also associated with "Company 3" 250 by virtue of the existing parent-child relationships.

FIG. 2D and Table 4 also include incomplete information (indicated by dashed lines and boxes in FIG. 2D) for the additional entities: "Manager 2B?" 224, "Manager 2A?" 234, "Company 2?" 220, and "Headquarters?" For example, at this point we may only know that "Manager 2B?" 224 exists by virtue of the parent information provided with "Assistant 2B1" 226. Since there is not direct report information available (yet) for "Manager 2B?" 224, "Manager 2A?" 234, or "Company 2?" 220, we may make a calculated guess (based on other available information) as to the connections 290, 292, 294 with a parent entity. However, such connections may be designated as "pending verification," (as indicated by the dashed lies).

In this illustrative example, the available information may provide compelling evidence that a "Headquarters?" 202 (or an ultimate parent entity) exists in the organizational hierarchy structure. Thus, a placeholder may be created for this entity. According to an example implementation of the disclosed technology, as additional information becomes available (and is utilized) about the various entities of the hierarchal structure, more accurate details about the structure may be known and recorded. Thus, we may refer back to FIG. 2A and Table 1 as a complete, updated structure of the illustrative organization in which the various branches of the organization are associated with different example product lines.

Figure 2E:
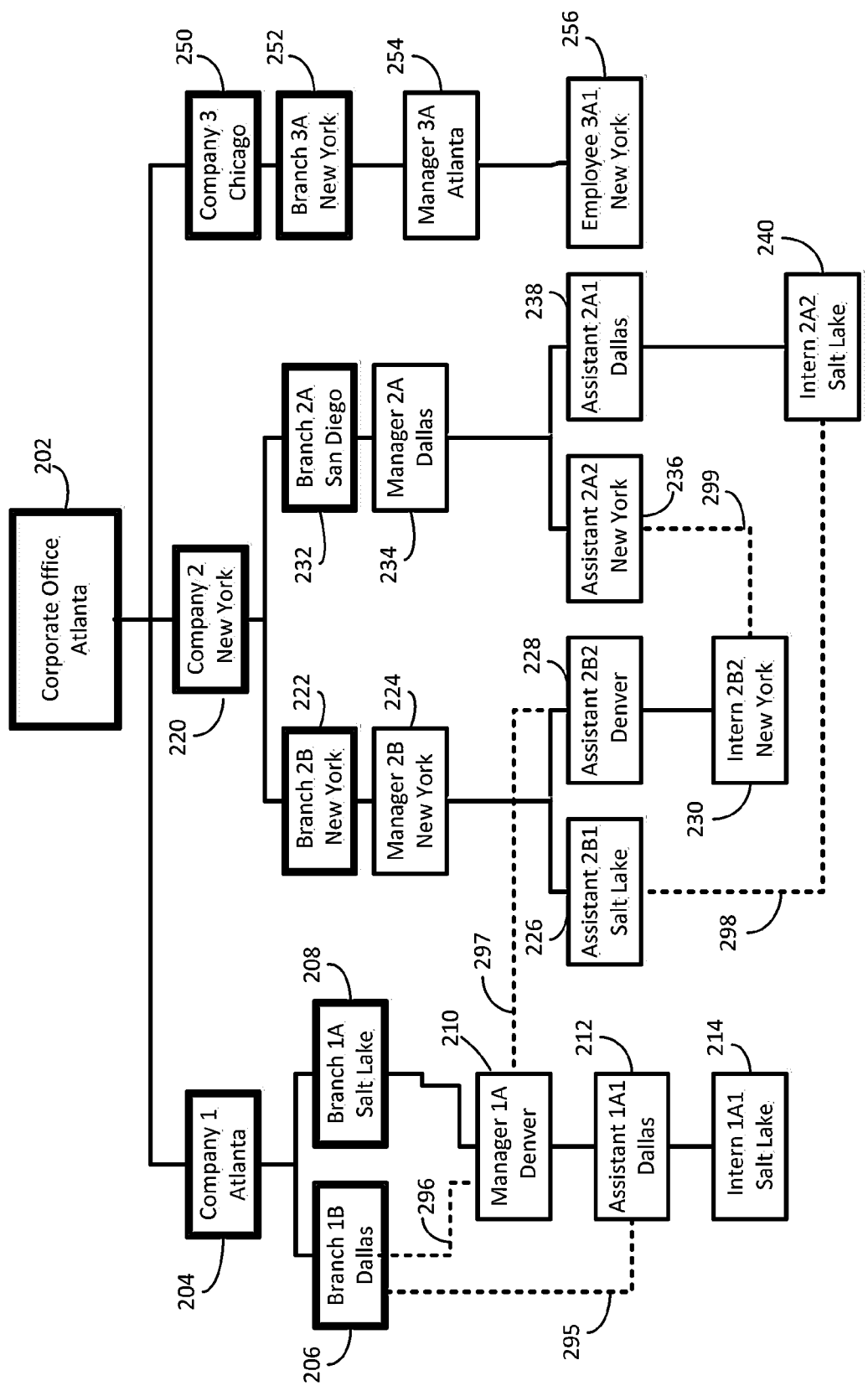
FIG. 2E is a block diagram depicting an example complex hierarchy structure.

FIG. 2E depicts an organization structure (similar to the structure shown in FIG. 2A) but having non-hierarchical connections 295, 296, 297, 298, 299 for purposes of comparison. For example, the connection 295 linking "Branch 1B" 206 with "Assistant 1A1" 212 bypasses the typical hierarchical chain that may exist between "Branch 1B" 206 and "Manager 1A" 210. Furthermore, "Manager 1A" 210 is shown having a parent connection 296 with both "Branch 1B" 206 and "Branch 1A" 208, and thus, this is not a strict hierarchy. While certain non-hierarchical connections (for example, connections 295, 296, 297, 298, 299) may exist in a structure, certain embodiments of the disclosed technology may be utilized to identify and/or flag such connections. In certain example embodiments, non-hierarchical connections may be ignored. In other example embodiments, non-hierarchical connections may be utilized to help determine the structure of the organization, particularly in the early stages of process if other strict-hierarchical information is not complete.

Figure 3:
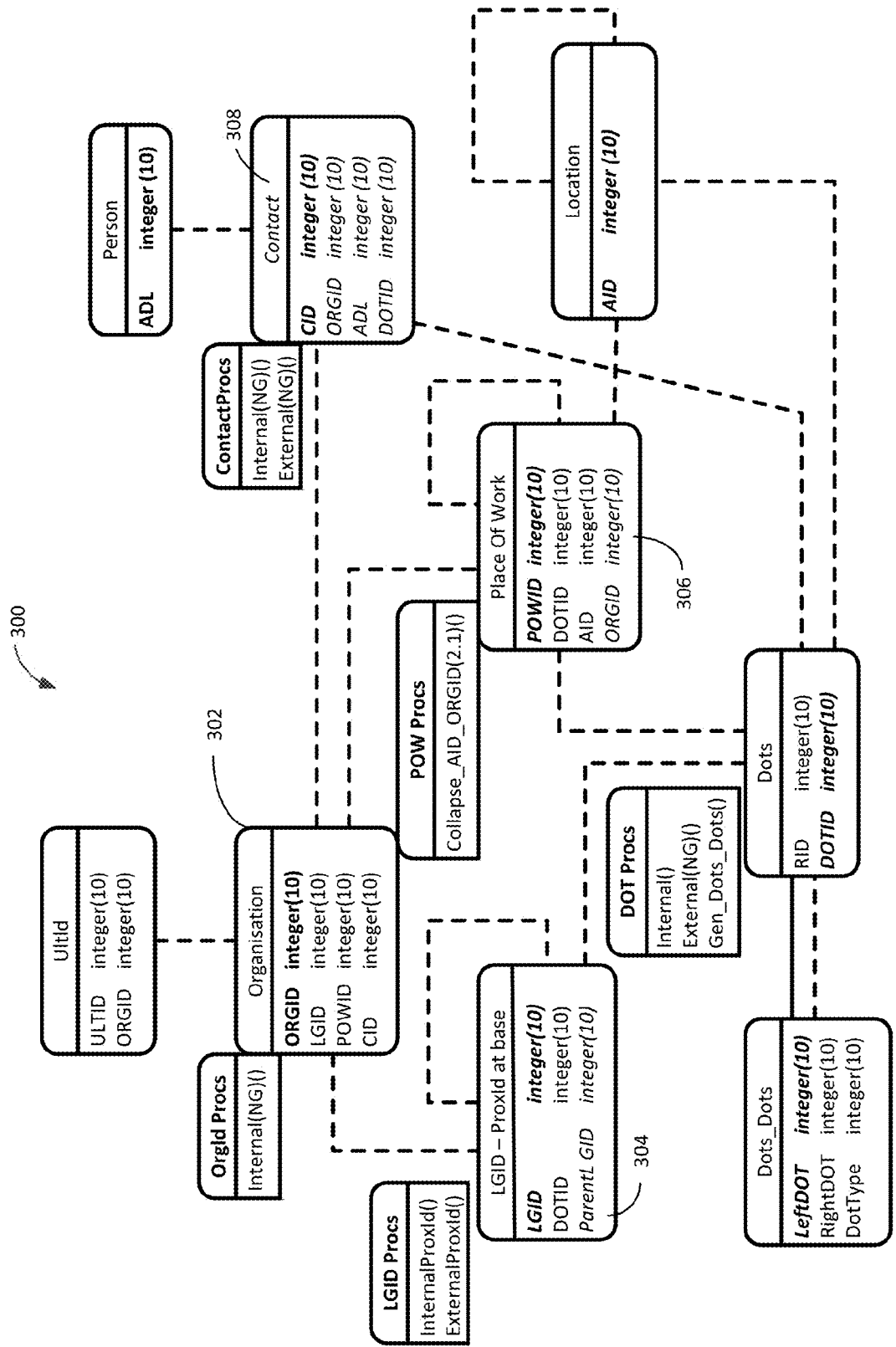
FIG. 3 is a block diagram depicting an example organization and associated hierarchical linkages.

FIG. 3 depicts an alternative illustrative example of a fairly complex hierarchical map where the entity data 300 is not necessarily arranged in a visually comprehendible form. In this example illustration, the entity data 300 associated an organization identification 302 (shown in FIG. 3 as ORGID) may include fields for data such as the business unit legal identity 304 (shown in FIG. 3 as LGID), fields for the place of work identifier 306 (shown in FIG. 3 as POWID), fields for the person identification 308 (shown in FIG. 3 as a CID or ContactID), etc.

For purposes of illustration, we may assume that the business unit legal identity 304, the place of work identifier 306, and the person identification 308 are all on the same hierarchical level, with the organization identification 302 in a higher level. According to an example embodiment, the person identification 308 may be defined as all of the references to a single person (for example, an employee) at a given organization 302. However, this definition may be viewed two completely different ways when the linking process is considered. For example: (a) only two references can be linked into a single person identification 308 if they are already part of an organization 302 (this is the downwards direction in terms of the hierarchy); or (b) two references link together a single person identification 308 but such linking connections currently stem from organizations that have different organization identifications 302, and thus, such information may be compelling enough to link the organization identifications 302 (this is the upwards direction in terms of the hierarchy). Therefore, according to certain example implementations, there could be two different linkage processes for each of entities on the same level: up and a down. The implication is that three different processes could be combining organization identifications 302 while three different processes might be relying upon the values in them. At the same time, the organization identifications 302 may have its own entity linking process that does not require input from the other three processes.

According to certain example implementations of the disclosed technology, an order of processing these links may be defined such that, for any given record, the links to parent (and grand parent, etc.) levels are evaluated first (the up process), then for any given record, the links to children (and grand children, etc.) may be determined, the entities may be linked or combined if compelling enough (as described above) and the cycle may start over to continue refining the linking connections. In addition, and according to certain example implementations, the most mutually compelling link for any given ID-ID pair may be taken in a single iteration. Thus, in according to an example implementation, all processes may establish their most compelling links prior to any of them having to make harder decisions.

In accordance with certain example implementations of the disclosed technology, the process of associating records or entities in a hierarchical structure may include clustering hierarchical database records into a first set of clusters having corresponding first cluster identifications (IDs), each hierarchical database record may include one or more field values, and the clustering may be based at least in part on determining similarity among corresponding field values of the hierarchical database records.

According to an example implementation of the disclosed technology, the hierarchical database may include certain duplicate records which may (or may not) refer to the same entity. For example, the initial database may include a number of disjointed entities (such as depicted in FIG. 2C) having connections to certain parent entities. In one example implementation, the process may include determining parent-child hierarchical relationships among the hierarchical database records and associating related hierarchical database records by applying a hierarchal directional linking process. The hierarchal directional linking process may include selecting and applying at least an upward process based on the determined parent-child hierarchical relationship. The upward process may include determining, from the parent-child hierarchical relationships, similarity among a plurality of child records having separate parent records.

According to an example implementation, and in response to determining a threshold similarity among that the plurality of child records, the process may include inferring that the separate parent records correspond to the same entity. Thus, according to an example implementation, similarities among certain child records may be compelling enough to infer that they have the same parent record.

In the examples presented above, in reference to FIG. 2C and FIG. 2D, a similarity among the child records (such as the product information shown in the right-hand column of Table 1 and Table 3) having separate parent records may be compelling enough to infer that the separate parent records ("Company X?" 222 and "Company Y? 233" correspond to the same entity ("Company 2?" 220).

According to an example implementation, the process may include re-clustering at least a portion of the database records into a second set of clusters having corresponding second cluster IDs. The re-clustering may be based at least in part on the associating related hierarchical database records and on the determining similarity among corresponding field values of the database records. In certain example implementations, the re-clustering may be based at least in part on the associating related hierarchical database records and on the determining similarity among one or more attribute identifiers associated with the database records. In certain example implementations of the disclosed technology, the resulting database record information may be provided as output based at least in part on the re-clustering.

As indicated above, and according to certain example implementations of the disclosed technology, each hierarchical database record may corresponds to an entity representation, and each hierarchical database record may include a plurality of fields, each field may be configured to contain a field value, and each field value may be assigned a field value weight corresponding to a specificity of the field value in relation to all field values in a corresponding field of the records.

In certain example implementations of the disclosed technology, the hierarchal directional linking process may further include selecting and applying a downward process (for example, in a direction from a parent to children records) that may include linking two or more records on a given hierarchy level based at least in part on the two records sharing a common parent record.

As discussed previously, the process of determining the similarity among the corresponding field values of the database records may include assigning a hyperspace attribute to each database record, wherein the hyperspace attribute corresponding to two database records is correlated with a similarity of the corresponding field values of the two database records. The process may include determining membership of each database record in a plurality of hyperspace clusters based at least in part on the hyperspace attributes, assigning, to each record, a cluster ID and a match value reflecting a likelihood that the record is a member of a particular hyperspace cluster, and linking related records based at least in part on the cluster ID and the match value. In an example implementation, determining membership of each database record in the plurality of hyperspace clusters may include creating a plurality of nodes at random locations in hyperspace, each node maintaining records in hyperspace based on the hyperspace attribute for which it is the closest node.

According to an example embodiment, the process may include merging database records having hyperspace attribute differences within a predefined criteria to eliminate similar exemplars that are likely to represent a same entity, resulting in a reduced set of database records. In certain example embodiments, the field value weights may be re-calculated for the reduced set of database records and the reduced set of records may be re-clustered based at least in part on the recalculated field value weights.

In accordance with an example implementation, associating related hierarchical database records may further include the process of determining highest compelling linkages among the hierarchical database records. For example, this process of determining highest compelling linkages may involve identifying mutually preferred pairs of records from the hierarchical database records, where each mutually preferred pair of records consists of a first record and a second record, and the first record consists of a preferred record associated with the second record and the second record consists of a preferred record associated with the first record, and the mutually preferred pairs of records each has a match score that meets pre-specified match criteria. The process of determining highest compelling linkages may further involve assigning, for each record from the hierarchical database records, at least one associated preferred record, where a match value assigned to a given record together with its associated preferred record is at least as great as a match value assigned to the record together with any other record in the database records. The process may further include forming and storing a plurality of entity representations in the database, where each entity representation of the plurality of entity representations includes at least one linked pair of mutually preferred records.

Figure 7:
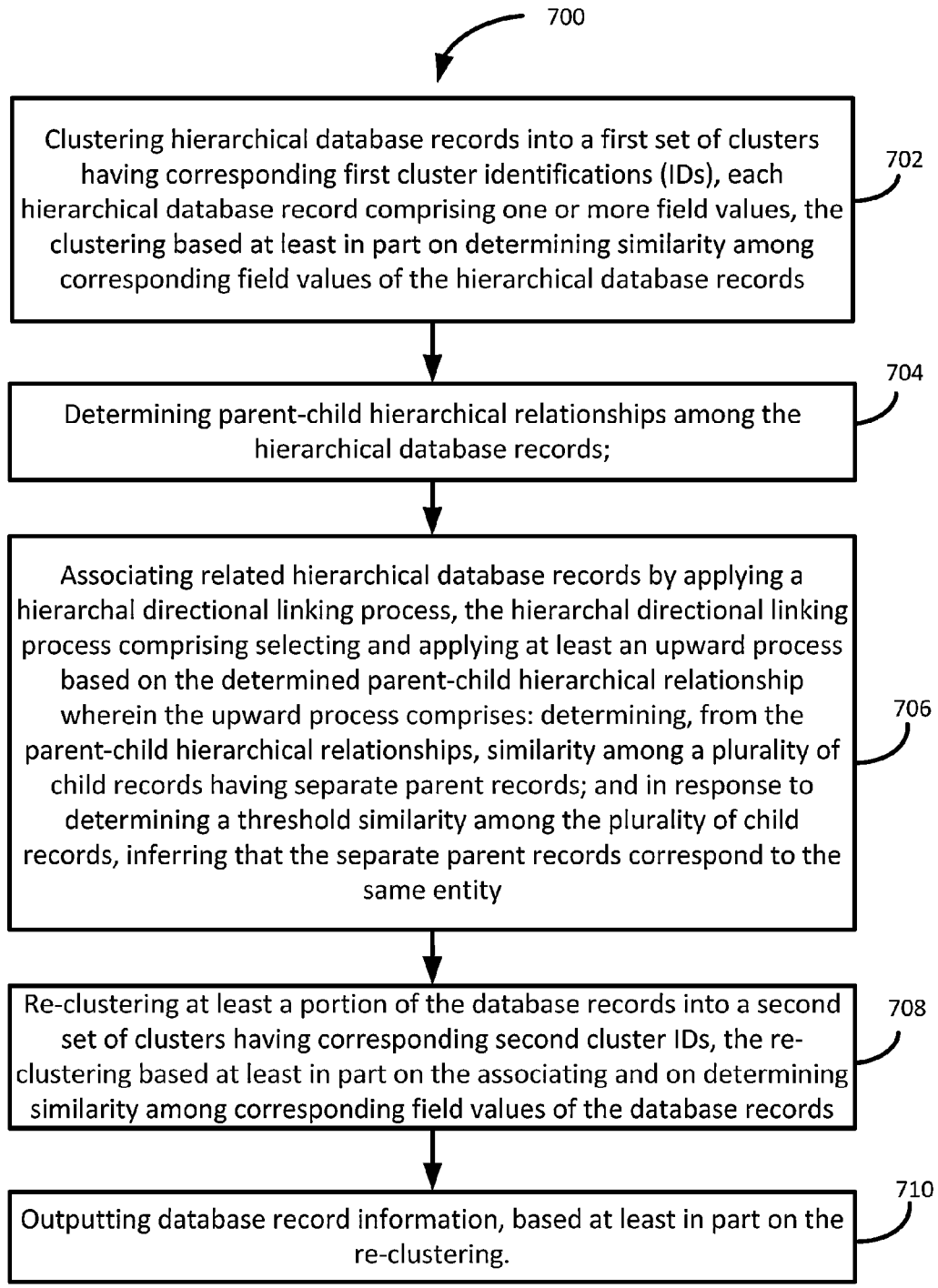
FIG. 7 is a flow diagram of another method according to an example implementation of the disclosed technology.

An example method 700 for external linking of records based on hierarchal level weightings will now be described with reference to the flowchart of FIG. 7. The method 700 starts in block 702, and according to an example implementation includes clustering hierarchical database records into a first set of clusters having corresponding first cluster identifications (IDs), each hierarchical database record comprising one or more field values, the clustering based at least in part on determining similarity among corresponding field values of the hierarchical database records. In block 704, the method 700 includes determining parent-child hierarchical relationships among the hierarchical database records. In block 706, the method 700 includes associating related hierarchical database records by applying a hierarchal directional linking process, the hierarchal directional linking process including selecting and applying at least an upward process based on the determined parent-child hierarchical relationship, the upward process may include determining, from the parent-child hierarchical relationships, similarity among a plurality of child records having separate parent records, and in response to determining a threshold similarity among the plurality of child records, inferring that the separate parent records correspond to the same entity. In block 708, the method 700 includes re-clustering at least a portion of the database records into a second set of clusters having corresponding second cluster IDs, the re-clustering based at least in part on the associating related hierarchical database records and on the determining similarity among corresponding field values of the database records. In block 710, the method 700 includes outputting database record information, based at least in part on the re-clustering.

In certain example implementations of the disclosed technology, the hierarchal directional linking process may further include selecting and applying a downward process including linking two or more records on a given hierarchy level based at least in part on the two records sharing a common parent record. In certain example implementations of the disclosed technology, determining the similarity among the corresponding field values of the database records may include assigning a hyperspace attribute to each database record, wherein the hyperspace attribute corresponding to two database records is correlated with a similarity of the corresponding field values of the two database records. In certain example implementations of the disclosed technology, determining the similarity among the corresponding field values of the database records may include determining membership of each database record in a plurality of hyperspace clusters based at least in part on the hyperspace attributes. In certain example implementations of the disclosed technology, determining the similarity among the corresponding field values of the database records may include assigning, to each record, a cluster ID and a match value reflecting a likelihood that the record is a member of a particular hyperspace cluster and linking related records based at least in part on the cluster ID and the match value.

In certain example implementations of the disclosed technology, the hierarchal directional linking process may further include merging database records having hyperspace attribute differences within a predefined criteria to eliminate similar exemplars that are likely to represent a same entity, the merging resulting in a reduced set of database records. An example embodiment may include recalculating the field value weights for the reduced set of database records and re-clustering the reduced set of records based at least in part on the recalculated field value weights.

According to an example implementation, membership of each database record in the plurality of hyperspace clusters may further include creating a plurality of nodes at random locations in hyperspace, each node maintaining records in hyperspace based on the hyperspace attribute for which it is the closest node.

According to an example implementation, associating related hierarchical database records further include determining highest compelling linkages among the hierarchical database records. The determining may include identifying mutually preferred pairs of records from the hierarchical database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria. The determining may include assigning, for each record from the hierarchical database records, at least one associated preferred record, wherein a match value assigned to a given record together with its associated preferred record is at least as great as a match value assigned to the record together with any other record in the database records. The determining may further include forming and storing a plurality of entity representations in the database, each entity representation of the plurality of entity representations comprising at least one linked pair of mutually preferred records.

According to certain example implementations, a hierarchical database record may correspond to an entity representation, each hierarchical database record may include a plurality of fields, each field may be configured to contain a field value, and each field value may be assigned a field value weight corresponding to a specificity of the field value in relation to all field values in a corresponding field of the records.

(1B2) Internal Co-Convergence Using Clustering when there is Hierarchy in the Data Structure and the Hierarchy Relationship is Known In accordance with certain example implementations of the disclosed technology, a hierarchical relationships defining interrelations among records in a data structure may already be known (or previously determined), but additional information may be desired. In scenario, and according to certain example embodiments, additional information may be obtained via a co-convergence and clustering process, as previously described. For example, the process may include clustering hierarchical database records into a first set of clusters having corresponding first cluster identifications (IDs), each hierarchical database record including one or more field values, and the clustering may be based at least in part on determining one or more similarities among corresponding field values of the hierarchical database records. In this example embodiment, clustering of the hierarchical database records may be performed based on known (or received) parent-child hierarchical relationship information for the hierarchical database records. In this example embodiment, the process may include re-clustering at least a portion of the hierarchical database records into a second set of clusters having corresponding second cluster IDs based at least in part on the received parent-child hierarchical relationship information.

As discussed in the previous section (for example, with respect to FIG. 1), and according to an example implementation, determining the similarity among the corresponding field values of the hierarchical database records may include one or more of the following steps: (1) assigning a hyperspace attribute to each hierarchical database record, where the hyperspace attribute corresponding to two hierarchical database records is correlated with a similarity of the corresponding field values of the two hierarchical database records; (2) determining membership of each hierarchical database record in a plurality of hyperspace clusters based at least in part on the hyperspace attributes; (3) assigning, to each record, a cluster ID and a match value reflecting a likelihood that the record is a member of a particular hyperspace cluster; (4) linking related records based at least in part on the cluster ID and the match value; (5) merging hierarchical database records having hyperspace attribute differences within a predefined criteria to eliminate similar exemplars that are likely to represent a same entity, the merging resulting in a reduced set of hierarchical database records; (6) recalculating the field value weights for the reduced set of hierarchical database records; and (7) re-clustering the reduced set of records based at least in part on the recalculated field value weights.

In accordance with certain example implementations of the disclosed technology, the process may further include determining compelling linkages among the hierarchical database records by identifying mutually preferred pairs of records from the hierarchical database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria. According to an example implementation, the process of determining the compelling linkages may further include assigning, for each record from the database records, at least one associated preferred record, wherein a match value assigned to a given record together with its associated preferred record is at least as great as a match value assigned to the record together with any other record in the hierarchical database records. According to an example implementation, the process of determining compelling linkages may further include forming and storing a plurality of entity representations in the database, each entity representation of the plurality of entity representations including at least one linked pair of mutually preferred records.

According to certain example embodiments of the disclosed technology, identifying mutually preferred pairs of records may involve mutually preferred pair of records consisting of a third record and a fourth record, and linking the third record to the fourth record. In an example implementation, the process may include allowing a user to retrieve information from at least one of the third record and the fourth record.

Various embodiments described herein may further include embodiment include an optional process whereby each preferred record associated with a given record includes a record that, when paired with the given record, has a maximal assigned match score in comparison to match scores assigned to other record pairs comprising the given record. In certain example embodiments, at least one mutually preferred pair of records may further include a fifth record and a sixth record, and the process may include altering at least one field value from the fifth record based on at least one field value from the sixth record. According to an example implementation, the match score may reflect a number of data field entries common to the pair of records.

Another optional feature of the disclosed technology may include, prior to the step of linking, assigning to each pair of records from a third plurality of records a match score, the match score reflecting a probability that the pair of records is related, where the second plurality of records includes the third plurality of records, determining, for each record from a fourth plurality of records, at least one associated preferred record, where the third plurality of records includes the fourth plurality of records, where a match score assigned to a given record together with its associated preferred record is at least as great as a match score assigned to the record together with any other record in the third plurality of records, and identifying mutually preferred pairs of records from the fourth plurality of records, each mutually preferred pairs of records consisting of a fifth record and a sixth record, the fifth record consisting of a preferred record associated with the sixth record and the sixth record consisting of a preferred record associated with the fifth record.

Another example implementation of the disclosed technology may include assigning a match score to a pair of records as determined by comparing data field entries of the pair of records. For example, this example implementation may include comparing only a portion of data fields common to the pair of records. For example, the process may assign a match score to a pair of records as calculated based at least on entries in at least one data field common to each record of the pair. Example implementation may involve a database that includes a fifth record and a sixth record, where the fifth record is an associated preferred record of the sixth record and where the sixth record is not an associated preferred record of the fifth record.

Figure 8:
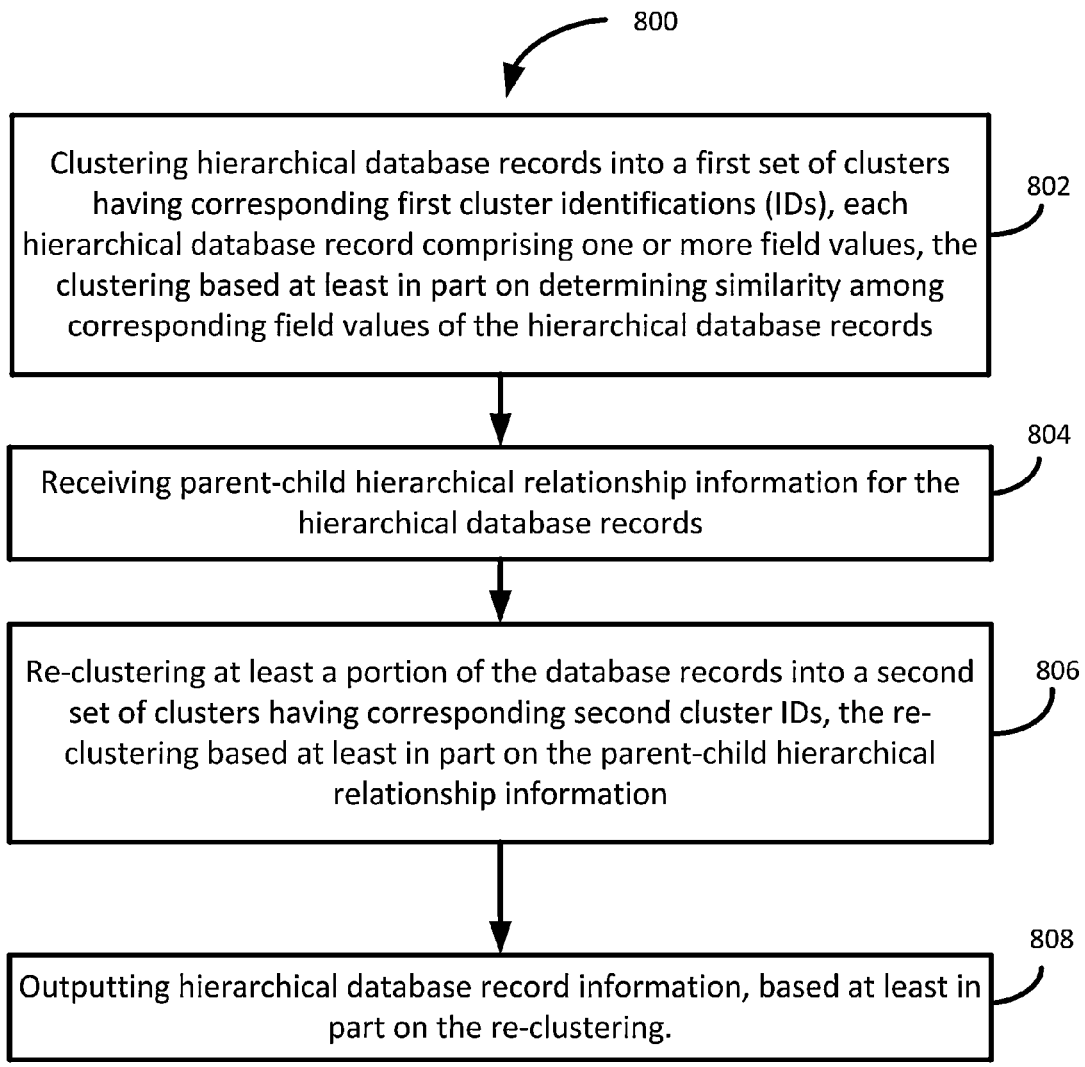
FIG. 8 is a flow diagram of another method according to an example implementation of the disclosed technology.

An example method 800 is now presented with reference to the flowchart of FIG. 8 for performing internal co-convergence using clustering when there is a hierarchy in the data structure and the hierarchy relationship is known. The method 800 starts in block 802, and according to an example implementation includes clustering hierarchical database records into a first set of clusters having corresponding first cluster identifications (IDs), each hierarchical database record comprising one or more field values, the clustering based at least in part on determining similarity among corresponding field values of the hierarchical database records. In block 804, the method 800 includes receiving parent-child hierarchical relationship information for the hierarchical database records. In block 806, the method 800 includes re-clustering at least a portion of the hierarchical database records into a second set of clusters having corresponding second cluster IDs, the re-clustering based at least in part on the received parent-child hierarchical relationship information. In block 808, the method 800 includes outputting hierarchical database record information, based at least in part on the re-clustering.

In accordance with an example implementation, determining the similarity among the corresponding field values of the hierarchical database records may include assigning a hyperspace attribute to each hierarchical database record, wherein the hyperspace attribute corresponding to two hierarchical database records is correlated with a similarity of the corresponding field values of the two hierarchical database records. In an example implementation, determining the similarity among the corresponding field values of the hierarchical database records may further include determining membership of each hierarchical database record in a plurality of hyperspace clusters based at least in part on the hyperspace attributes. In an example implementation, determining the similarity among the corresponding field values of the hierarchical database records may further include assigning, to each record, a cluster ID and a match value reflecting a likelihood that the record is a member of a particular hyperspace cluster. Example embodiments may further include linking related records based at least in part on the cluster ID and the match value.

Example embodiments may further include merging hierarchical database records having hyperspace attribute differences within a predefined criteria to eliminate similar exemplars that are likely to represent a same entity, the merging resulting in a reduced set of hierarchical database records. Example implementations may includere calculating the field value weights for the reduced set of hierarchical database records and re-clustering the reduced set of records based at least in part on the recalculated field value weights.

Certain example implementations may include determining highest compelling linkages among the hierarchical database records. The determining may include identifying mutually preferred pairs of records from the hierarchical database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria. In certain example implementations, the determining may include assigning, for each record from the database records, at least one associated preferred record, wherein a match value assigned to a given record together with its associated preferred record is at least as great as a match value assigned to the record together with any other record in the hierarchical database records. In certain example implementations, the determining may include forming and storing a plurality of entity representations in the database, each entity representation of the plurality of entity representations comprising at least one linked pair of mutually preferred records.

According to an example implementation, a given hierarchical database record may correspond to an entity representation or an entity. In an example implementation, each database record may include a plurality of fields, each field configured to contain a field value, and each field value assigned a field value weight corresponding to a specificity of the field value in relation to all field values in a corresponding field of the records.

(2) External Linking Based on Hierarchal Level Weightings

External linking, which is sometimes referred to as "entity resolution," may be contrasted with internal linking. External linking may involve a process of linking information from an external file to a previously linked base file (or authority file) in order to assign entity identifiers to the external data. In typical embodiments of the disclosed technology, internal and external linking are completely different processes, executed at different times for different reasons. However, an external linking process may act upon a file created by the internal linking process—but this is not a requirement. For example, and according to certain example implementations, an internal linking process may be utilized as initial process to characterize or group data when data relationships are not known beforehand. In an example implementation, an external linking process may be utilized after at least some data relationships are established by the internal linking process.

Figure 4A:
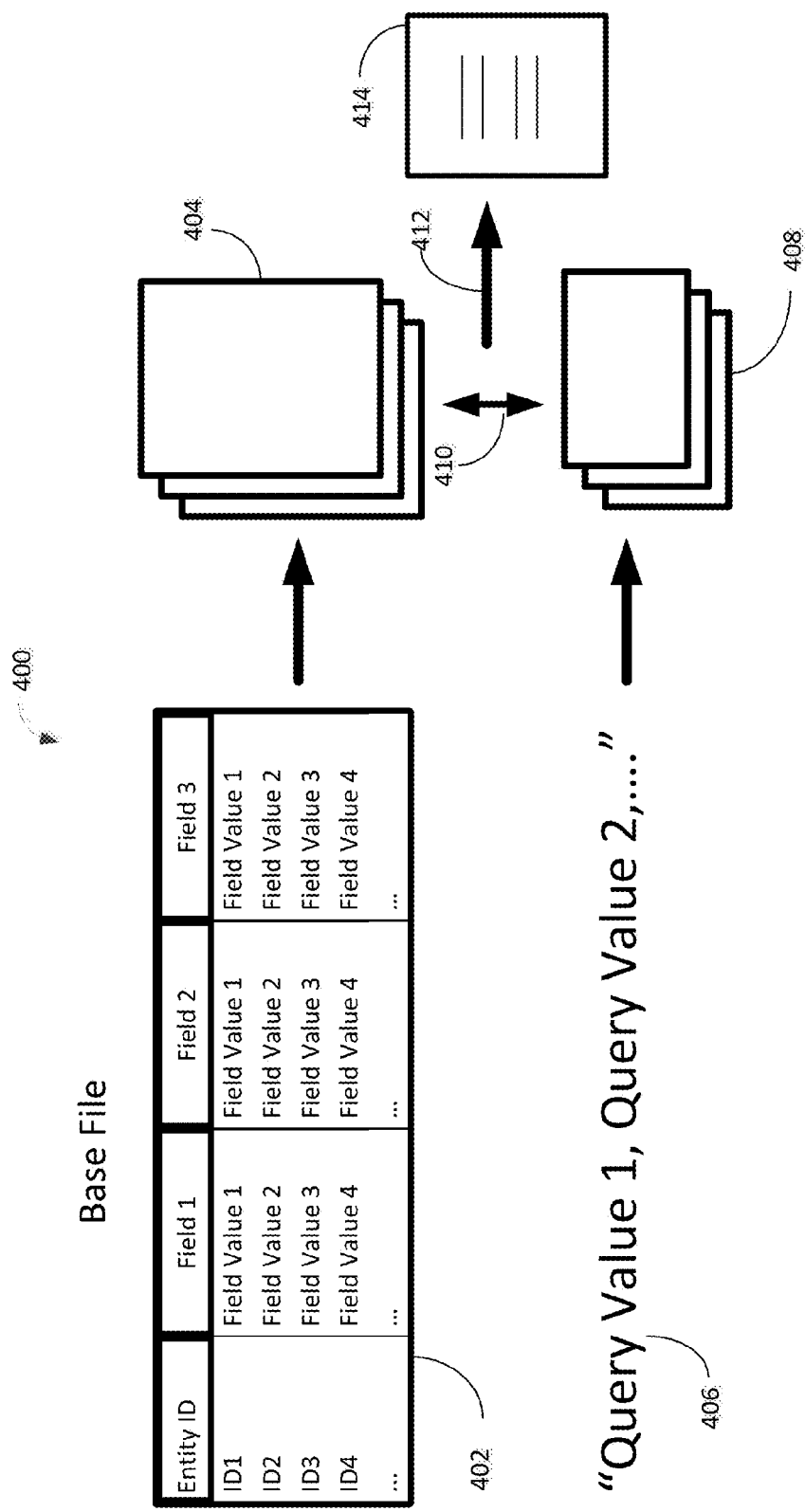
FIG. 4A depicts an example implementation of an external linking process, according to an example embodiment of the disclosed technology.

FIG. 4A depicts an example implementation of an external linking process 400, according to an example embodiment of the disclosed technology. For example, a base file 402 may be utilized in the external linking process and may include a file, table, or database with records representing one or more entities (as indicated by the rows of the base file 402). Each entity may be assigned a unique identifier, and the corresponding fields may be populated with associated field values (while certain fields may be left blank if the particular field value is not available or does not apply). The base file 402 may include fields such as name, address, phone, social security number, etc., along with the unique identifiers that may signify to which entity each record belongs.

According to an example implementation of the disclosed technology, the base file 402 may be divided (or "shredded") into multiple tables 404. For example, in a simple implementation, the base file 402 may be utilized to populate one table for each of the fields (for example, one table for names, one table for addresses, one table for phone numbers, etc.). In an example implementation of the disclosed technology, each table 404 may be scrubbed to eliminate duplicate records (deduped). In an example implementation, each table entry may be sorted so that, for each name, there is a sorted list of entities with that name (and for each address there is a sorted list of entities at that address etc.) while keeping track of the unique identifiers associated with each record or entity. According to an example implementation, the tables may then be indexed to allow quick retrieval of any given record. For example, the index may allow rapid retrieval of an entity list for a given address.

In an example implementation, the external linking process 400 may further include receiving an input query file 406 having one or more query terms (or query values) that may be utilized to search for and retrieve matching records from the base file 402 (or the multiple tables 404). According to an example implementation of the disclosed technology, the input file may be divided (or "shredded") into multiple query tables 408. For example, in a simple implementation, the input query file 406 may be utilized to populate one table for each of the query fields (for example, one table for names, one table for addresses, one table for phone numbers, etc.).

The example processes described above may be considered as preliminary steps for preparing the base file 402 and associated tables 404 for a query 406 using specific input criteria that may match with the field values in the tables 404.

An example external linking process may utilize a specific query file 406, such as Dave Smith, 123 Main Street, New York, N.Y., 917-555-1212, 052-21-1234. In an example implementation, this query input may be divided (or "shredded") into multiple fields 408 (similar to the way the base file 402 is treated) and the results may be utilized to fetch matches (or partial matches) from the previously mentioned tables 404 that correspond to the base file 402 information.

In an illustrative example, suppose that the input query 406 is shredded into three tables 408 with data from the corresponding three fields: Name, Address, Social Security Number (for example: Dave Smith, 123 Main Street, 052-21-1234). In this example, the query may return two entries for the "Social Security" (two possible entities in the base file 402 having used the Social Security number of 052-21-1234), 130 people having an "Address" of 123 Main Street, and 2450 people with the "Name" of Dave Smith (since this is a common name).

According to an example implementation, the resulting lists 414 may be sorted by the unique entity identifiers, merged by the identifiers, and each entity may be evaluated for a count of the number of tables in which they appear. According to an example implementation, the merged lists may then be sorted by the number of count of tables in which each entity appeared, and the entity with the most appearances may be declared the best match to the information provided in the input query 406.

Figure 4B:
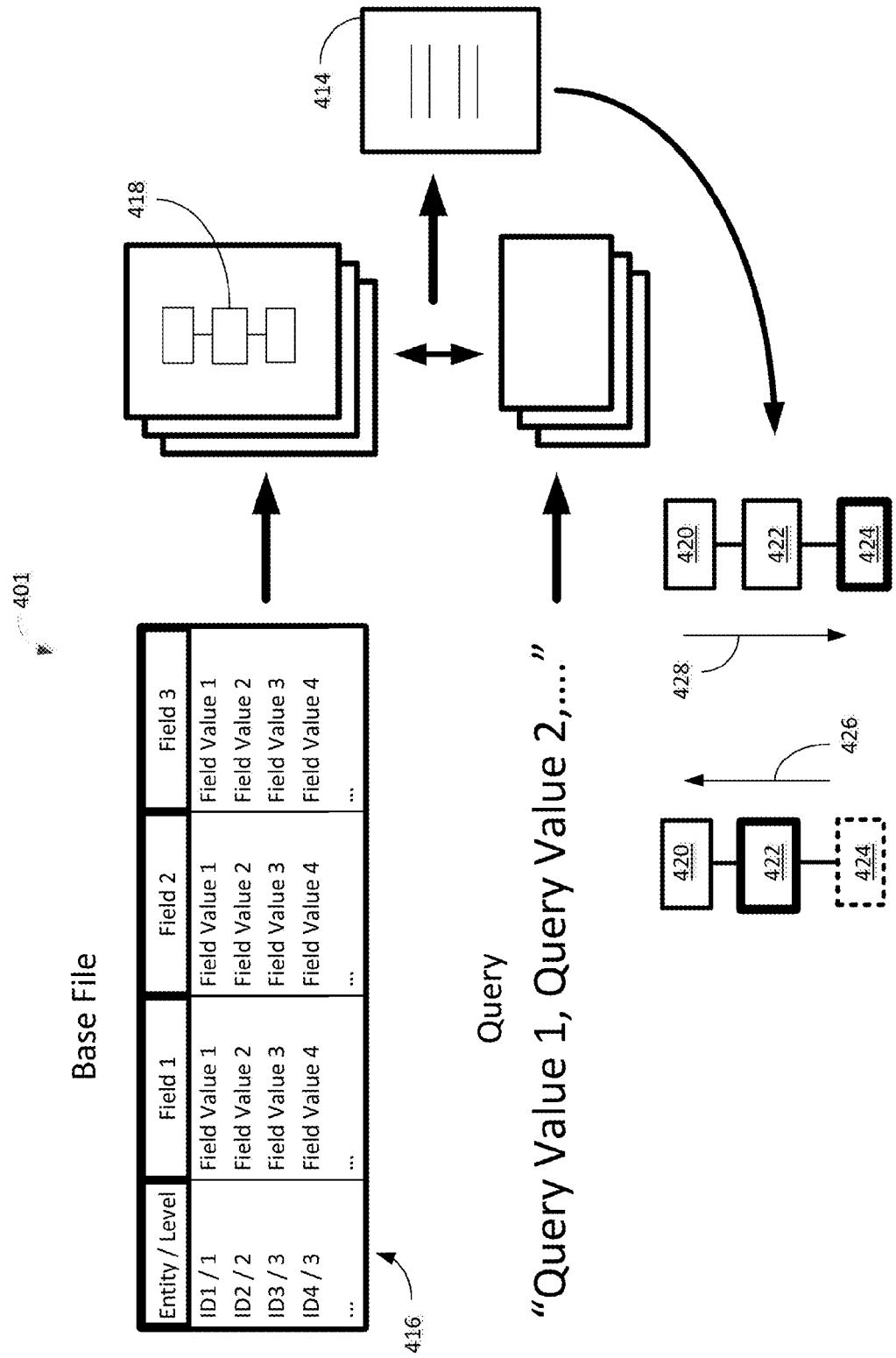
FIG. 4B depicts an external linking process, in accordance with an example implementation of the disclosed technology, in which the entities may form a hierarchy.

FIG. 4B depicts an external linking process 401, in accordance with an example implementation of the disclosed technology, in which the entities may form a strict hierarchy, and we wish to be able to perform an external link for a given record in the hierarchy. According to an example implementation, this external linking process 401 may share certain similarities with the process 400 described above and depicted in FIG. 4A. For example, embodiments may utilize an external linking process may include rolling-up scores from the various linkpaths, similar to process described in paragraphs [0218]-[0258] in the U.S. Patent Publication 2010/0094910 that is incorporated herein by reference.

In an example implementation, the external linking process 401 may return one or more matching entity records (or IDs) 420 422 424 from the hierarchical base file 416, determine which hierarchy level(s) 418 are associated with the returned records, and attempt to resolve 428 the lowest child record 424 by performing certain tests. In one example implementation, a test for resolving a record may include scoring the returned records based on certain matching and/or uniqueness criteria and picking the best match based on the score. In another example implementation, a test for resolving a record may include determining if the associated score is greater than or equal to a predetermined value. In another example implementation, a test for resolving a record may be based on a difference in scores between the first and second best matched records. Example embodiments may utilize various combinations of these tests to resolve a record.

In an example implementation, when "matching" records are returned having different levels in the hierarchy 418, and when the lowest child record 424 is not properly resolved, the process 401 may be utilized to re-roll 426 intermediate results from the children records into their parent records. In an example implementation, if a parent record 422 resolves, then the associated record may be returned. In an example implementation, if the parent record does not resolve, then results may be "rolled-up" to the grandparent level 420, and so forth. According to certain example embodiments, the less data that is available in the base file 416, or the less specific the query, the more likely it is that the parent/grandparent etc. levels may be utilized to resolve a record.

Example embodiments may include associating external query data 406 having one or more query field values with a record in a linked hierarchical database. The linked hierarchical database may include a plurality of records, each record having a record identifier and representing an entity in a hierarchy, each record associated with a hierarchy level, each record including one or more fields, each field configured to contain a field value. The associating may include receiving the external query data, wherein the external query data includes one or more search values; and identifying, from the plurality of records in the linked hierarchical database, one or more matched fields having field values that at least partially match the one or more search values.

Example embodiment may further include scoring, with zero or more match weights, each of the one or more matched fields; determining an aggregate weight for each matched field based at least in part on the scoring with the zero or more match weights; sorting the one or more matched fields according to the determined aggregate weights; merging, based at least in part on determining the aggregate weights, the one or more matched fields to form a merged table having records with matched fields sorted by aggregate weights; scoring the merged table based at least in part on the aggregate weights; identifying, based at least in part on the scoring, a grouping comprising one or more of the plurality of entities within a same branch of the hierarchy and corresponding to different hierarchy levels; and outputting, based at least in part on the scoring and identifying, a record identifier corresponding to a matching entity in the hierarchy.

In certain embodiments, scoring, with the zero or more match weights may include scoring each of the one or more matched fields with a uniqueness weight, the uniqueness weight representing a specificity of the field value in relation to all field values in a corresponding field of the plurality of records in the linked hierarchical database. Example embodiments may include at least partially forming one or more search tables corresponding to the one or more search values and at least partially forming one or more base tables corresponding to the one or more fields of the plurality of records of the linked hierarchical database. In certain embodiments, the merging, based at least in part on determining the aggregate weights, can include combining at least a portion of the one or more search tables and the one or more base tables to form the merged table.

According to an example implementation of the disclosed technology, partially forming the one or more base tables may include at least partially forming tables having multiple fields and wherein the base tables include record identifiers for each entity in the hierarchy. Certain embodiments may include sorting each entity in the hierarchy by an associated hierarchy level. In one example implementation, the sorting may include progressively sorting each entity in the hierarchy by each hierarchy level from a highest level to a lowest level in the hierarchy. In certain embodiments, the one or more search tables and/or the one or more base tables may include zero or more common fields. The one or more base tables may include record identifiers for each entity in the hierarchy.

Certain example embodiments may further include determining, from the merged table, and based at least in part from the aggregate weights, a first leading scorer of the matched fields and a second leading scorer of the matched fields, the first leading scorer associated with a record having a highest aggregate weight and the second leading scorer associated with a record having a second highest aggregate weight. Example embodiments may include determining a first condition that may include determining whether a first weight associated with the first leading scorer meets or exceeds a first predetermined value. Example embodiments may include determining a second condition that may include determining whether a difference between the first weight and a second weight associated with the second leading scorer meets or exceeds a second predetermined value. Example embodiments may include determining if a matching entity corresponds to the first leading scorer and may be based at least in part on the determining of the first condition and on the determining of the second condition.

Certain example embodiments may include merging aggregate weights of one or more entities associated with intermediate hierarchy levels in the grouping in response to determining that the first condition or the second condition is not met. Certain example embodiments may include re-determining the first condition and the second condition, and outputting a record identifier corresponding to an entity associated with a lowest hierarchy level of the grouping in response to re-determining the first condition and the second condition. In certain example embodiments, a matching entity may further correspond to an entity associated with a lowest hierarchy level associated with the grouping. For example, information may be obtained and utilized through implementations of the disclosed technology that may allow resolving a record having the lowest possible hierarchy position in grouping. In certain embodiments, if the (child) record occupying the lowest hierarchy position in grouping is not resolved (via the tests or conditions described above), then embodiments of the disclosed technology may attempt to resolve the next lowest parent record, and so forth.

According to an example implementation of the disclosed technology, an aggregate weight for each field may be calculated based, at least in part, on field values scored from each of the plurality of records in the linked hierarchical database. As an example, suppose that a query value of "H" returns a score of 2 based on matches with records in the "First Name" field from a first child record in a hierarchy. Now, suppose that for a second child record, a query value of "Harold" returns a score of 9 in the "First Name" field. The higher score may result because the "Harold" query includes much more specific information than "H", but "H" and "Harold" may represent the same entity (i.e., such field values do not necessarily conflict with each other). Thus, the aggregate score for the field may be 9 because the information is not necessarily additive. Now suppose that a score of 10 is returned for the first child record in response to a query of "84720" in the "Zip Code" field, and a score of 10 is returned for a second child record in response to the query of "84724." In this situation, the aggregate score may be 20 because the record matches two different zip codes, and the information may be considered to be additive.

Certain example implementations of the disclosed technology may include selecting and applying a downward process (for example, in a direction from a parent to children records) that may link two or more records on a given hierarchy level based at least in part on determining that the two or more records share a common parent record.

According to an example implementation of the disclosed technology, one or more matched fields having field values that at least partially match the one or more search value may be identified from the plurality of records in the linked hierarchical database by identifying, from the one or more base tables, one or more matched fields having field values that at least partially match the one or more search values. In certain example implementations, identifying the one or more matched fields may include determining highest compelling linkages among the hierarchical database records. Such a determination may include identifying mutually preferred pairs of records from the hierarchical database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria. In certain embodiments, the one or more matched fields may be further identified by assigning, for each record from the hierarchical database records, at least one associated preferred record, where a match value assigned to a given record together with its associated preferred record is at least as great as a match value assigned to the record together with any other record in the database records. Certain embodiments may further include forming and storing a plurality of entity representations in the database, each entity representation of the plurality of entity representations comprising at least one linked pair of mutually preferred records.

Figure 9:
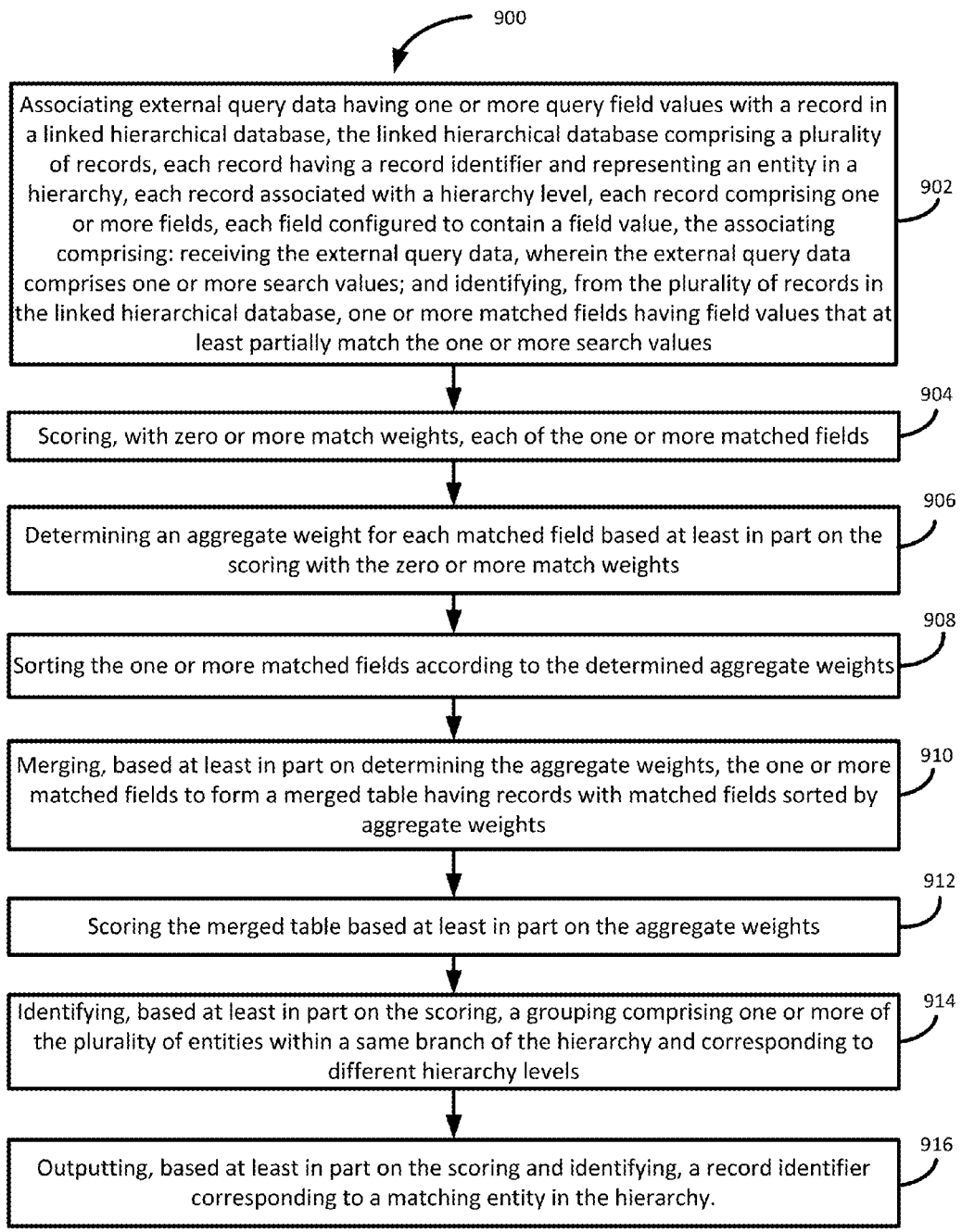
FIG. 9 is a flow diagram of another method according to an example implementation of the disclosed technology.

An example method 900 for performing external linking based on hierarchal level weightings will now be described with reference to the flowchart of FIG. 9. The method 900 starts in block 902, and according to an example implementation includes associating external query data having one or more query field values with a record in a linked hierarchical database, the linked hierarchical database including a plurality of records, each record having a record identifier and representing an entity in a hierarchy, each record associated with a hierarchy level, each record including one or more fields, each field configured to contain a field value, the associating including receiving the external query data, wherein the external query data comprises one or more search values; and identifying, from the plurality of records in the linked hierarchical database, one or more matched fields having field values that at least partially match the one or more search values. In block 904, the method 900 includes scoring, with zero or more match weights, each of the one or more matched fields. In block 906, the method 900 includes determining an aggregate weight for each matched field based at least in part on the scoring with the zero or more match weights. In block 908, the method 900 includes sorting the one or more matched fields according to the determined aggregate weights. In block 910, the method 900 includes merging, based at least in part on determining the aggregate weights, the one or more matched fields to form a merged table having records with matched fields sorted by aggregate weights. In block 912, the method 900 includes scoring the merged table based at least in part on the aggregate weights. In block 914, the method 900 includes identifying, based at least in part on the scoring, a grouping comprising one or more of the plurality of entities within a same branch of the hierarchy and corresponding to different hierarchy levels. In block 916, the method 900 includes outputting, based at least in part on the scoring and identifying, a record identifier corresponding to a matching entity in the hierarchy.

According to an example implementation, scoring, with the zero or more match weights may include scoring each of the one or more matched fields with a uniqueness weight, the uniqueness weight representing a specificity of the field value in relation to all field values in a corresponding field of the plurality of records in the linked hierarchical database.

Certain example implementations may further include at least partially forming one or more search tables corresponding to the one or more search values; and at least partially forming one or more base tables corresponding to the one or more fields of the plurality of records of the linked hierarchical database. In an example implementation, merging, based at least in part on determining the aggregate weights may include combining at least a portion of the one or more search tables and the one or more base tables to form the merged table. In an example implementation, at least partially forming the one or more base tables may include at least partially forming tables having multiple fields and wherein the base tables comprise record identifiers for each entity in the hierarchy. Example implementations may further include sorting each entity in the hierarchy by an associated hierarchy level, where the sorting each entity in the hierarchy by the associated hierarchy level includes progressively sorting each entity in the hierarchy by each hierarchy level from a highest level to a lowest level in the hierarchy.

According to an example implementation, the one or more search tables may include zero or more common fields. In certain example embodiments, the one or more base tables may include zero or more common field. In certain example implementations, the one or more base tables may include record identifiers for each entity in the hierarchy.

Example embodiments of the disclosed technology may further include determining, from the merged table, and based at least in part from the aggregate weights, a first leading scorer of the matched fields and a second leading scorer of the matched fields, the first leading scorer associated with a record having a highest aggregate weight and the second leading scorer associated with a record having a second highest aggregate weight. Certain example implementations may include determining a first condition comprising whether a first weight associated with the first leading scorer meets or exceeds a first predetermined value. Certain example implementations may include determining a second condition comprising whether a difference between the first weight and a second weight associated with the second leading scorer meets or exceeds a second predetermined value. According to an example implementation, a matching entity may correspond to the first leading scorer and is based at least in part on the determining of the first condition and on the determining of the second condition. In accordance with an example implementation, the matching entity may further correspond to an entity associated with a lowest hierarchy level associated with the grouping.

Example implementations of the disclosed technology may further include merging aggregate weights of one or more entities associated with intermediate hierarchy levels in the grouping in response to determining that the first condition or the second condition is not met. Certain example embodiments may include re-determining the first condition and the second condition, and outputting a record identifier corresponding to an entity associated with a lowest hierarchy level of the grouping in response to re-determining the first condition and the second condition. According to an example implementation, an aggregate weight for each field may be based, at least in part, on field values scored from each of the plurality of records in the linked hierarchical database.

(3) Populating Entity Fields Based on Hierarchy Partial Resolution

In accordance with certain example implementations of the disclosed technology, interrelations among records in a data structure may be organized according to strict hierarchical relationships, and the hierarchy relationships and structure may already be known (or previously determined). In an example implementation, such relationships may be utilized to enhance performance and accuracy of certain processes, such as those associated with form filling, searching, etc.

For example, consider a typical process for entering information in an online form. The traditional form filling process may rely upon the user to enter correct information in form input boxes. The form may be associated with an auto-correct and/or an autofill feature that may suggest spelling corrections and/or automatically populate a field based on information from a previously filled form. A typical online form-filling process may allow a user to enter information in the form without relying on the actual data in a hierarchy. As an example, consider the field-by-by field basis of a typical autofill function. If a user types the letters "M" and "I" in a city field of a form, the city starting with MI and having the largest population may autofill the form. Since many cities start with the letters "MI", unless it was intended by the user to enter "Miami," then the autofill may produce the wrong results, which could lead to an error in the form.

In a typical search engine, and in response to receiving a term or phrase as a query input, the search engine may rely upon previously indexed words that have been extracted from web page titles, page content, headings, etc., and results may be returned based on relevance to the query. For example, when a user enters a query into a search engine, the engine may examine an index and provide a listing of best-matching results. However, a traditional search engine may not utilize information in a hierarchy structure to limit the scope of the search to results within the hierarchy.

According to an example implementation of the disclosed technology, input data may be received at a processor (for example, in response to a user typing characters into an online form field) and as the input data is received, embodiments of the disclosed technology may begin to resolve an entity in a hierarchy based on the received input data. According to an example implementation of the disclosed technology, resolving the entity, and having access to its relationship in the hierarchy may allow enhancing suggestions for further specificity as additional query information is typed into associated form fields and received by the processor.

Example embodiments of the disclosed technology may provide the technical effect and benefit of speeding up the rate at which data may be entered. Such a technical effect may provide enhanced customer service, enhanced accuracy, and/or an enhanced user experience when filling-in forms or doing searches. Example embodiments of the disclosed technology may also provide form validation. For example, by offering suggestions, or by only allowing entry of specific data based on the information from the hierarchy, the form may be populated with the correct information so that it can be 100% correct when it is submitted.

Figure 5A:
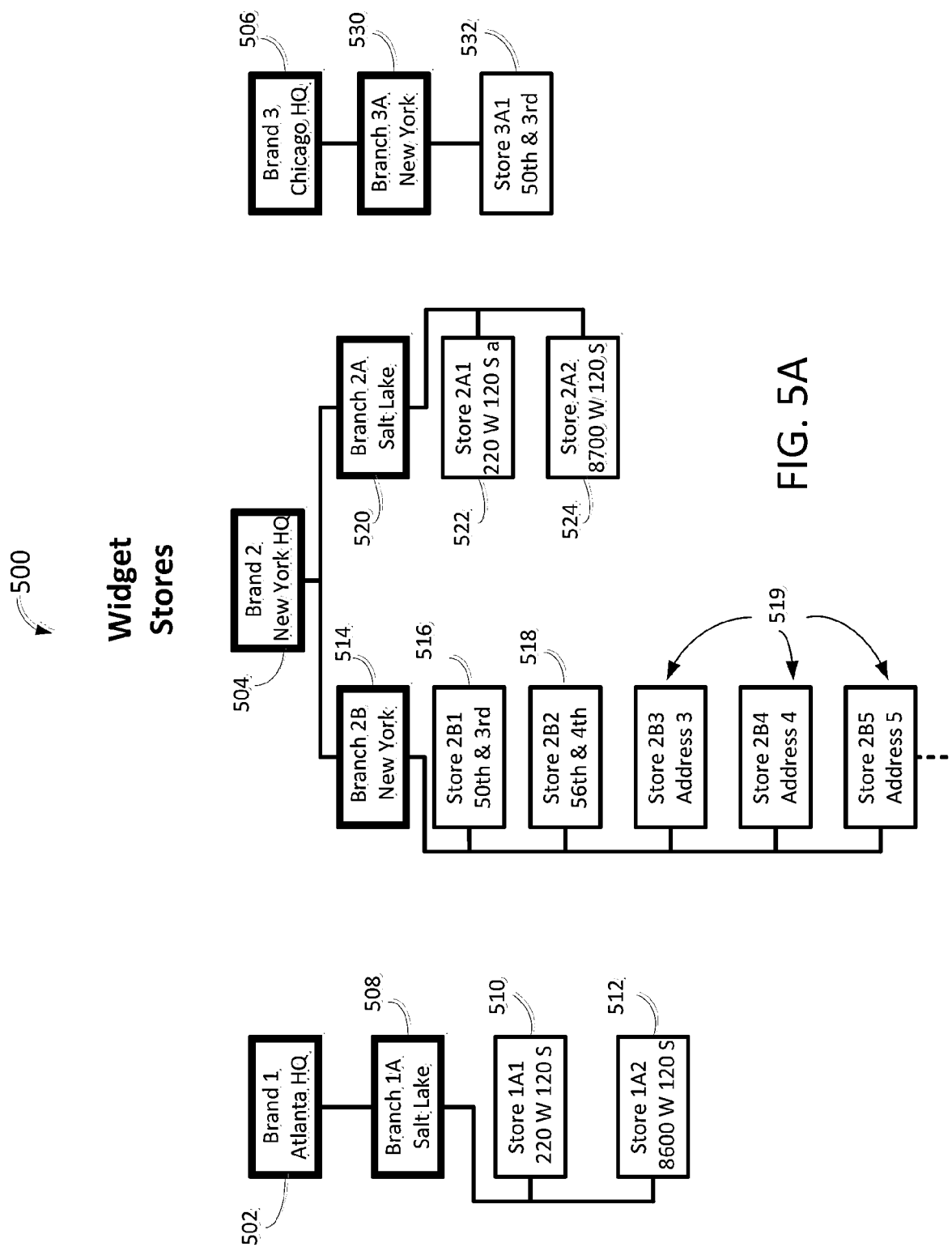
FIG. 5A depicts example hierarchical structures for illustration purposes.

FIG. 5A depicts example hierarchical structures 500 for illustration purposes. The information shown may represent data in one or more a hierarchical databases that are associated with "Widget Stores." For example, the hierarchy structure depicted on the left side may include headquarters for "Brand 1" 502 with a child "Branch 1A" 508 having children "Store 1A1" 510 and "Store 1A2" 512 at different addresses. The hierarchy structure depicted in the center of FIG. 5A may include headquarters for "Brand 2" 504 with children "Branch 2B" 514 and "Branch 2A" 520. "Branch 2B" 514 is depicted as having multiple children stores 516 518 519. "Branch 2A" 520 is depicted as having children "Store 2A1" 522 and "Store 2A2" 524 at different addresses. Finally, the hierarchy structure depicted in the right side of FIG. 5A may include headquarters for "Brand 3" 506 with a child "Branch 3A" 530 having child "Store 3A1" 532. The known hierarchical relationships, as depicted in this example, may be utilized for providing enhanced form filling and/or searching features in example embodiments, and will be explained below with reference to FIG. 5B and FIG. 5C.

Figure 5B:
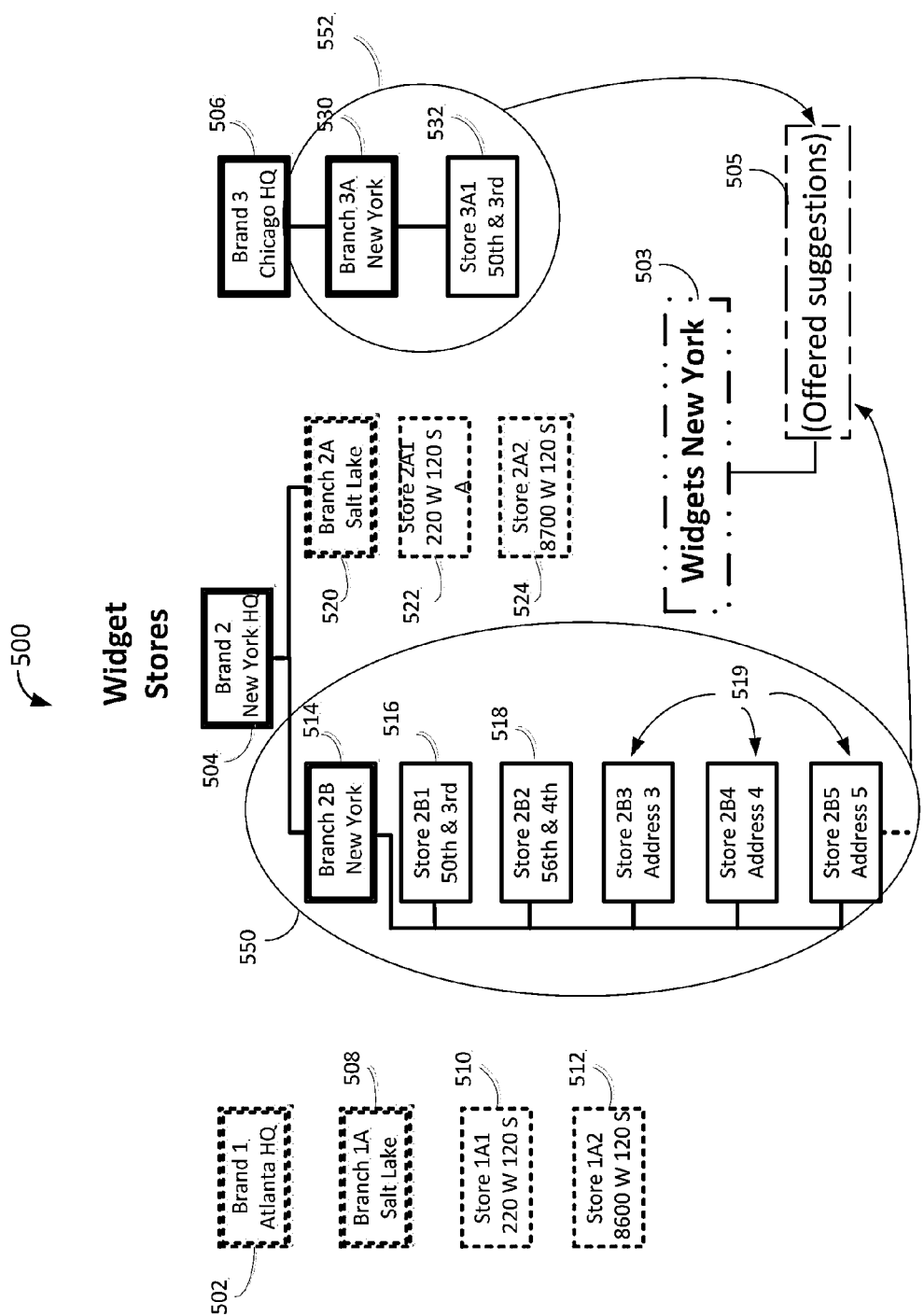
FIG. 5B depicts an intermediate result of an external linking process based on hierarchal level weightings, according to an example implementation of the disclosed technology.

FIG. 5B depicts an intermediate result of an external linking process based on hierarchal level weightings and/or partial resolution, according to an example implementation of the disclosed technology. For example, a user may begin entering "Widgets New York" into a form field 503. Based on the query information, and according to an example implementation, the various hierarchies associated with the word "widget" may be utilized as soon as the first query term (or just a part of the term) is entered and/or received by the system and/or server and/or processor. In an example implementation, a suggestion 505 for narrowing the specificity of the search, or for populating a subsequent query field may be output for display based on the first query term. For example, the offered suggestions 505 may include "Brand 1" "Brand 2" and/or "Brand 3" since each of these brands may be associated with the term "widgets," and the user may select one of the offered suggestions, rather than having to manually enter the term, thereby eliminating errors.

In accordance with various example implementations of the disclosed technology, and in response to a particular search term (or token) being entered into a form field 503, certain offered suggestions 505 related to the search term may be presented, for example, as a list, dropdown menu, etc. In one example implementation, multiple entities may be returned and provided in a list for selection. In certain example implementations of the disclosed technology, selecting one of the offered suggestions 505 may filter and/or sort the offered suggestions 505 list for further entity specificity based on the selection.

In an example implementation, and in response to a particular search term (or token) being entered into a form field 503, multiple entities may be provided as offered suggestions 505. For example, a user may be presented with all child entity records 550 552 (and grandchild entity records, etc.) related to the search term, as depicted in FIG. 2B. In certain example implementations of the disclosed technology, the offered suggestions 505 may be filtered and/or sorted based on the specificity of the particular search term (or token). In certain example implementations of the disclosed technology, the specificity of the search term (or token) in relation to a parent entity (and/or grandparent entity records, etc.) may also be utilized to sort and/or filter the returned results or further offered suggestions 505.

As shown in FIG. 5B, and for further illustration, after user enters "Widgets New York" into a form field 503, part of the original hierarchy structure associated with "widgets" may no longer apply, and only those branches 550 552 that relate to both "widgets" and "New York" need to be searched, or offered for form input suggestion.

In accordance with various example implementations of the disclosed technology, and in response to a particular search term (or token) being entered into a form field 503, certain offered suggestions 505 related to the search term may be presented, for example, as a list, dropdown menu, etc. In one example implementation, multiple entities may be returned and provided in a list for selection. In certain example implementations of the disclosed technology, selecting one of the offered suggestions 505 may filter and/or sort the offered suggestions 505 list for further entity specificity based on the selection.

Figure 5C:
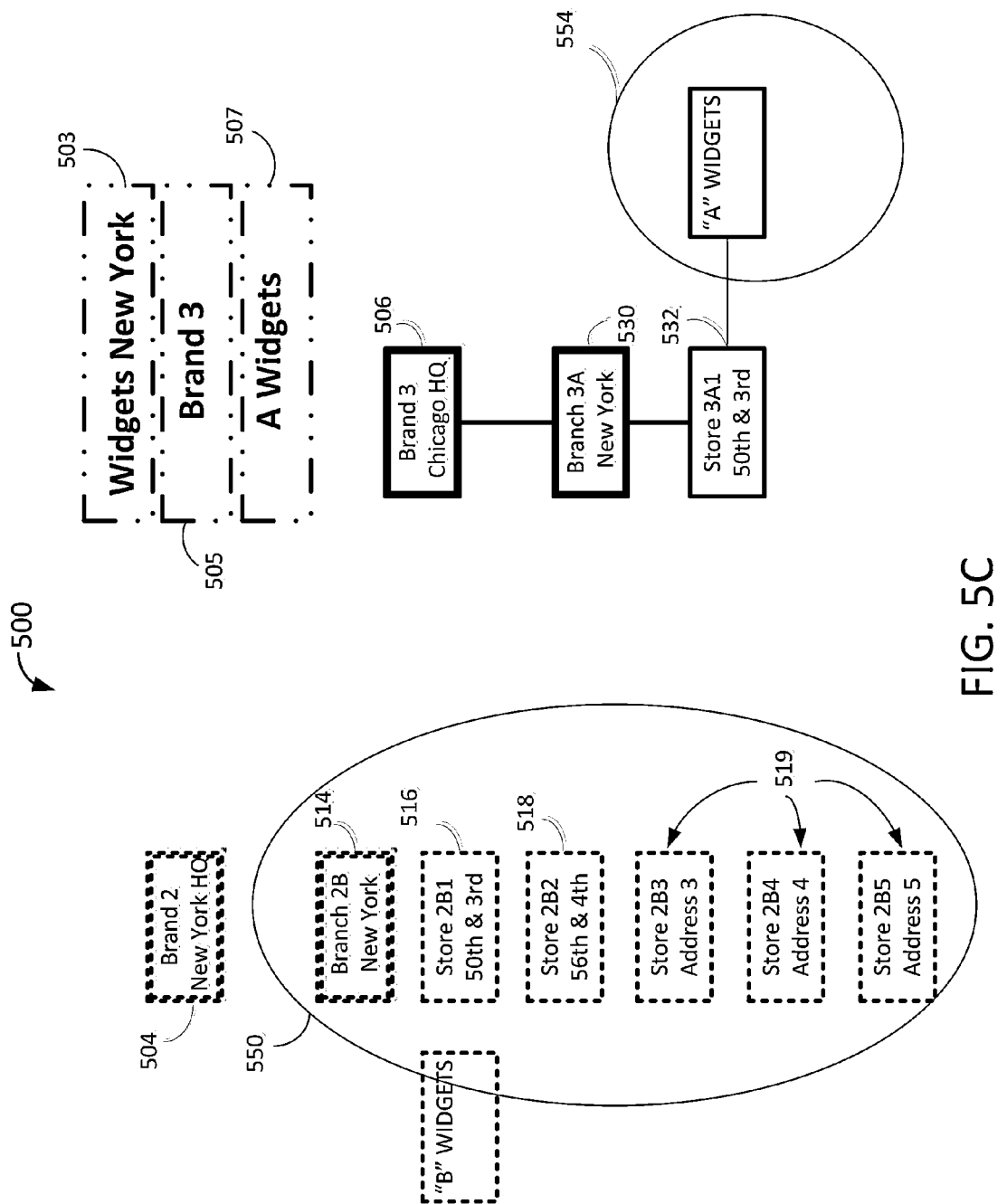
FIG. 5C depicts example results of an external linking process based on hierarchal level weightings, according to an example implementation of the disclosed technology.

In an example implementation, and in response to a particular search term (or token) being entered into a form field 503, multiple entities may be provided as offered suggestions 505. For example, a user may be presented with all child entity records 550 552 (and grandchild entity records, etc.) related to the search term, as depicted in FIG. 2B. In certain example implementations of the disclosed technology, the offered suggestions 505 may be filtered and/or sorted based on the specificity of the particular search term (or token). In certain example implementations of the disclosed technology, the specificity of the search term (or token) in relation to a parent entity (and/or grandparent entity records, etc.) may also be utilized to sort and/or filter the returned results or further offered suggestions 505. FIG. 5C continues this illustration and depicts example results that may be narrowed down to a specific record 554 in the hierarchy based on the input query data and/or selected suggested terms. For example, after entering "Widgets New York" in a form field 503, the available brands of widgets in New York may be offered for suggestion. The user may select one of the brands (for example "Brand 3" in a subsequent form field 505) and in response, available types of widgets (for example "A Widgets") may be offered for suggestion in a subsequent form field 507. Based on this information, the user may see that the type of widget 554 she is searching for may be located at a particular location 532, such as "Store 3A1" on "$50^{th}$ and $3^{rd}$." It should be noted that the illustration provided here and described with reference to FIGS. 5A-5C is intended to serve as a general example, and is not intended to limit the scope of the disclosed technology.

Figure 10:
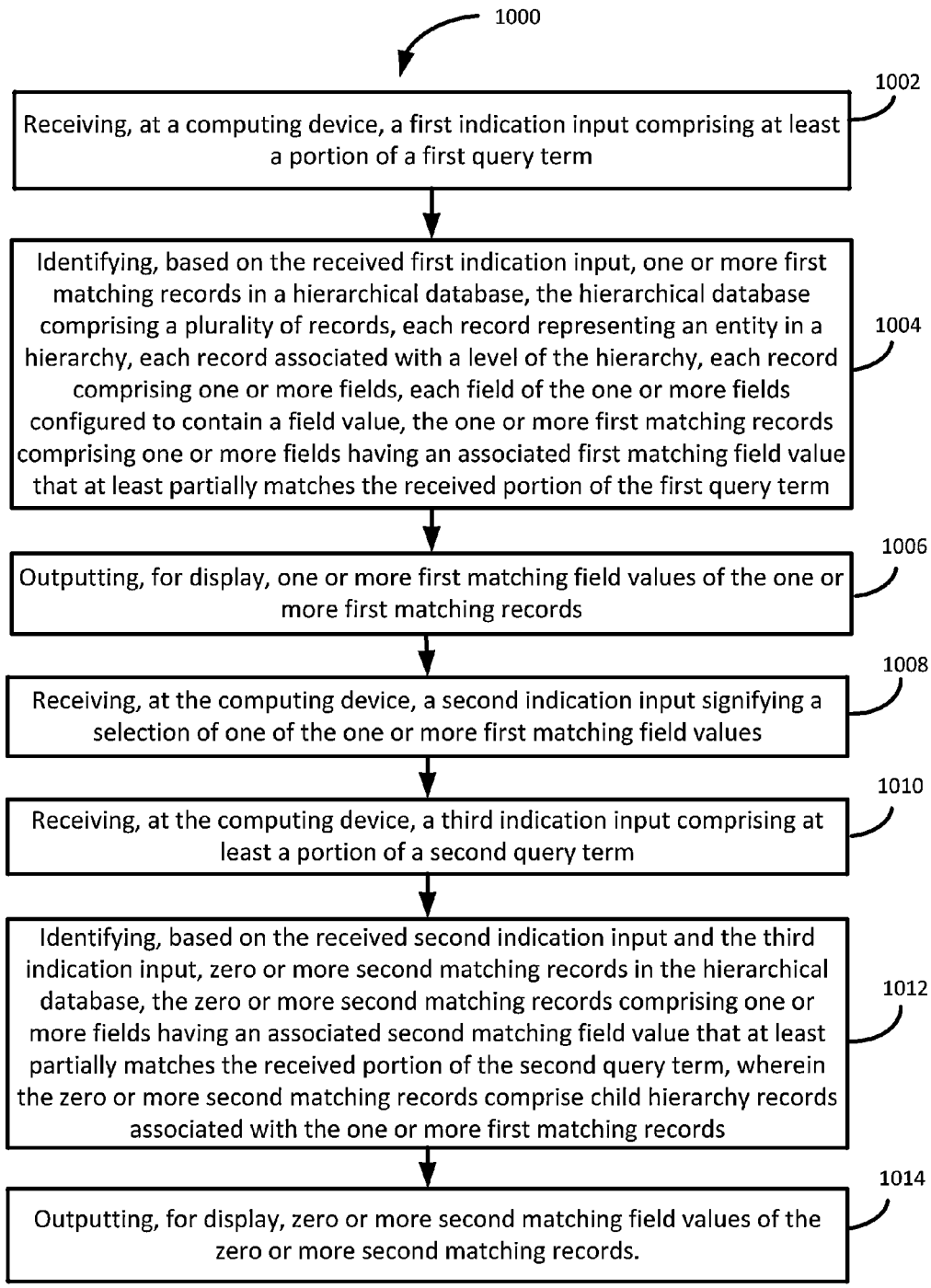
FIG. 10 is a flow diagram of another method according to an example implementation of the disclosed technology.

An example method 1000 for populating entity fields based on hierarchy partial resolution will now be described with reference to the flowchart of FIG. 10. The method 1000 starts in block 1002, and according to an example implementation includes receiving, at a computing device, a first indication input comprising at least a portion of a first query term. In block 1004, the method 1000 includes identifying, based on the received first indication input, one or more first matching records in a hierarchical database, the hierarchical database comprising a plurality of records, each record representing an entity in a hierarchy, each record associated with a level of the hierarchy, each record comprising one or more fields, each field of the one or more fields configured to contain a field value, the one or more first matching records comprising one or more fields having an associated first matching field value that at least partially matches the received portion of the first query term. In block 1006, the method 1000 includes outputting, for display, one or more first matching field values of the one or more first matching records. In block 1008, the method 1000 includes receiving, at the computing device, a second indication input signifying a selection of one of the one or more first matching field values. In block 1010, the method 1000 includes receiving, at the computing device, a third indication input comprising at least a portion of a second query term. In block 1012, the method 1000 includes identifying, based on the received second indication input and the third indication input, zero or more second matching records in the hierarchical database, the zero or more second matching records comprising one or more fields having an associated second matching field value that at least partially matches the received portion of the second query term, wherein the zero or more second matching records comprise child hierarchy records associated with the one or more first matching records. In block 1014, the method 1000 includes outputting, for display, zero or more second matching field values of the zero or more second matching records.

In certain example implementations of the disclosed technology, the zero or more second matching records, as referred-to above, may include only child hierarchy records associated with the one or more first matching records.

Certain example implementations may further include determining an uppermost hierarchical level corresponding to the one or more first matching records. In certain example implementations of the disclosed technology, outputting, for display, the one or more first matching field values associated with the one or more first matching records may further include outputting one or more first matching field values that are associated the uppermost hierarchical level.

According to an example implementation, identifying the one or more first matching records or the zero or more second matching records may include any number of processes, including, but not limited to fuzzy matching, string metrics (such as Levenshtein distance), phonetic processes or algorithms (such as Metaphone), etc. In certain example implementations, identifying the matching records may include a cascade process that utilizes multiple processes.

According to an example implementation, the disclosed technology may include outputting, for display, the one or more first matching field values of the one or more first matching records comprises a progressive correction of the first indication input. In certain example implementations of the disclosed technology, outputting, for display, the zero or more second matching field values of the zero or more second matching records includes a progressive correction of the third indication input.

Certain example implementations may include receiving, at a computing device, a fourth indication input signifying a selection of a second matching field value and identifying, based on the received fourth indication input and the third indication input, zero or more third matching records in the hierarchical database, the zero or more third matching records may include one or more fields having an associated third matching field value that at least partially matches the received portion of the second query term, wherein the zero or more third matching records may include child hierarchy records associated with the zero or more second matching records. Certain example implementations may further include outputting, for display, zero or more third matching field values of the zero or more third matching records.

The various embodiments disclosed herein may provide the technical effect of increasing speed and/or accuracy of various computer-implemented applications, including but not limited to data analytics, entity resolution, entity searching, and/or removal of duplicate records.

Preferably, the embodiments described herein provide for computer-implemented systems and/or methods to be performed using one or more computer processors. In certain example implementations, specialized computer systems may be preferable, for example, to handle the processing of databases with large amounts of data and/or to provide relatively fast processing speeds, etc.

In some instances, the systems described herein may include one or more computing devices that may be utilized to perform the methods and/or processes described herein. Example computing devices, as disclosed herein, may be referred to as one or more of a: desktop computer, server, laptop computer, tablet computer, set-top box, television, appliance, game device, medical device, display device, or some other like terminology including a mobile device, mobile computing device, a mobile station (MS), terminal, cellular phone, cellular handset, personal digital assistant (PDA), smartphone, wireless phone, organizer, handheld computer, In other instances, a computing device may be a processor, controller, or a central processing unit (CPU). In yet other instances, a computing device may be a set of hardware components.

The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like.

In some instances, a graphical user interface may be utilized herein and referred to as an object-oriented user interface, an application oriented user interface, a web-based user interface, a touch-based user interface, or a virtual keyboard. Certain example embodiments may include a presence-sensitive display, as discussed herein, which may be a display that accepts input by the proximity of a finger, a stylus, or an object near the display. For example, a user may provide an input to a computing device by touching the surface of a presence-sensitive display using a finger. In another example implementation, a user may provide input to a computing device by gesturing without physically touching any object. For example, a gesture may be received via a video camera or depth camera.

In some instances, a presence-sensitive display can have two main attributes. First, it may enable a user to interact directly with what is displayed, rather than indirectly via a pointer controlled by a mouse or touchpad. Secondly, it may allow a user to interact without requiring any intermediate device that would need to be held in the hand. Such displays may be attached to computers, or to networks as terminals. Such displays may also play a prominent role in the design of digital appliances such as the personal digital assistant (PDA), satellite navigation devices, mobile phones, and video games. Further, such displays may include a capture device and a display.

Figure 11:
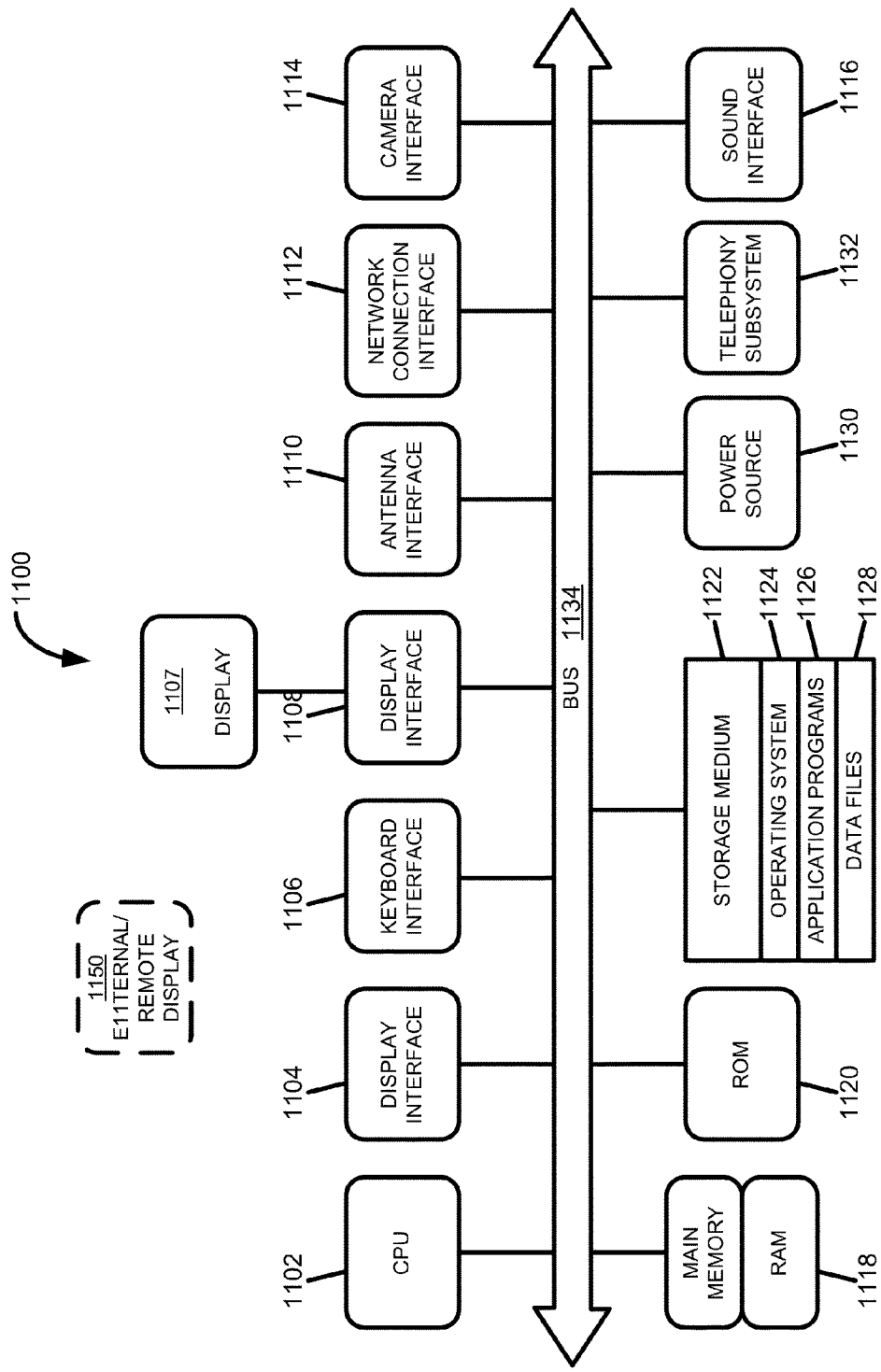
FIG. 11 is a block diagram of an illustrative computing system, according to an example implementation of the disclosed technology.

According to one example implementation, the terms computing device or mobile computing device, as used herein, may be a CPU, or conceptualized as a CPU (for example, the CPU 1102 of FIG. 11). In certain example implementations, the computing device (CPU) may be coupled, connected, and/or in communication with one or more peripheral devices, such as display, navigation system, stereo, entertainment center, Wi-Fi access point, etc. In another example implementation, the term computing device or mobile computing device, as used herein, may refer to a mobile computing device, such as a smartphone, mobile station (MS), terminal, cellular phone, cellular handset, personal digital assistant (PDA), smartphone, wireless phone, organizer, handheld computer, desktop computer, laptop computer, tablet computer, set-top box, television, appliance, game device, medical device, display device, or some other like terminology. In an example embodiment, the mobile computing device may output content to its local display and/or speaker(s). In another example implementation, the mobile computing device may output content to an external display device (e.g., over Wi-Fi) such as a TV or an external computing system.

Furthermore, the various aspects described herein may be implemented using standard programming or engineering techniques to produce software, firmware, hardware, or any combination thereof to control a computing device to implement the disclosed subject matter. The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

Various implementations of the communication systems and methods herein may be embodied in non-transitory computer readable media for execution by a processor. An example implementation may be used in an application of a mobile computing device, such as a smartphone or tablet, but other computing devices may also be used, such as to portable computers, tablet PCs, Internet tablets, PDAs, ultra mobile PCs (UMPCs), etc.

FIG. 11 depicts a block diagram of an illustrative computing device 1100 according to an example implementation. Various implementations and methods herein may be embodied in non-transitory computer readable media for execution by a processor. It will be understood that the computing device 1100 is provided for example purposes only and does not limit the scope of the various implementations of the communication systems and methods.

The computing device 1100 of FIG. 11 includes a central processing unit (CPU) 1102, where computer instructions are processed; a display interface 1104 that acts as a communication interface and provides functions for rendering video, graphics, images, and texts on the display. In certain example implementations of the disclosed technology, the display interface 1108 may be directly connected to a local display 1107. In another example implementation, the display interface 1108 may be configured for providing data, images, and other information for an external/remote display 1150 that is not necessarily physically connected to the mobile computing device. For example, a desktop monitor may be utilized for mirroring graphics and other information that is presented on a mobile computing device. In certain example implementations, the display interface 1108 may wirelessly communicate, for example, via a Wi-Fi channel or other available network connection interface 1112 to the external/remote display 1150.

In an example implementation, the network connection interface 1112 may be configured as a communication interface and may provide functions for rendering video, graphics, images, text, other information, or any combination thereof on the display. In one example, a communication interface may include a serial port, a parallel port, a general purpose input and output (GPIO) port, a game port, a universal serial bus (USB), a micro-USB port, a high definition multimedia (HDMI) port, a video port, an audio port, a Bluetooth port, a near-field communication (NFC) port, another like communication interface, or any combination thereof.

The computing device 1100 may include a keyboard interface 1106 that provides a communication interface to a keyboard. In one example implementation, the computing device 1100 may include a presence-sensitive display interface 1108 for connecting to a presence-sensitive display 1107. According to certain example implementations of the disclosed technology, the presence-sensitive display interface 1108 may provide a communication interface to various devices such as a pointing device, a touch screen, a depth camera, etc. which may or may not be associated with a display.

The computing device 1100 may be configured to use an input device via one or more of input/output interfaces (for example, the keyboard interface 1106, the display interface 1108, the presence sensitive display interface 1108, network connection interface 1112, camera interface 1114, sound interface 1116, etc.,) to allow a user to capture information into the computing device 1100. The input device may include a mouse, a trackball, a directional pad, a track pad, a touch-verified track pad, a presence-sensitive track pad, a presence-sensitive display, a scroll wheel, a digital camera, a digital video camera, a web camera, a microphone, a sensor, a smartcard, and the like. Additionally, the input device may be integrated with the computing device 1100 or may be a separate device. For example, the input device may be an accelerometer, a magnetometer, a digital camera, a microphone, and an optical sensor.

Example implementations of the computing device 1100 may include an antenna interface 1110 that provides a communication interface to an antenna; a network connection interface 1112 that provides a communication interface to a network. As mentioned above, the display interface 1108 may be in communication with the network connection interface 1112, for example, to provide information for display on a remote display that is not directly connected or attached to the system. In certain implementations, a camera interface 1114 is provided that acts as a communication interface and provides functions for capturing digital images from a camera. In certain implementations, a sound interface 1116 is provided as a communication interface for converting sound into electrical signals using a microphone and for converting electrical signals into sound using a speaker. According to example implementations, a random access memory (RAM) 1118 is provided, where computer instructions and data may be stored in a volatile memory device for processing by the CPU 1102.

According to an example implementation, the computing device 1100 includes a read-only memory (ROM) 1120 where invariant low-level system code or data for basic system functions such as basic input and output (I/O), startup, or reception of keystrokes from a keyboard are stored in a non-volatile memory device. According to an example implementation, the computing device 1100 includes a storage medium 1122 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 1124, application programs 1126 (including, for example, a web browser application, a widget or gadget engine, and or other applications, as necessary) and data files 1128 are stored. According to an example implementation, the computing device 1100 includes a power source 1130 that provides an appropriate alternating current (AC) or direct current (DC) to power components. According to an example implementation, the computing device 1100 includes and a telephony subsystem 1132 that allows the device 1100 to transmit and receive sound over a telephone network. The constituent devices and the CPU 1102 communicate with each other over a bus 1134.

In accordance with an example implementation, the CPU 1102 has appropriate structure to be a computer processor. In one arrangement, the computer CPU 1102 may include more than one processing unit. The RAM 1118 interfaces with the computer bus 1134 to provide quick RAM storage to the CPU 1102 during the execution of software programs such as the operating system application programs, and device drivers. More specifically, the CPU 1102 loads computer-executable process steps from the storage medium 1122 or other media into a field of the RAM 1118 in order to execute software programs. Data may be stored in the RAM 1118, where the data may be accessed by the computer CPU 1102 during execution. In one example configuration, the device 1100 includes at least 128 MB of RAM, and 256 MB of flash memory.

The storage medium 1122 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the device 1100 to access computer-executable process steps, application programs and the like, stored on removable and non-removable memory media, to off-load data from the device 1100 or to upload data onto the device 1100. A computer program product, such as one utilizing a communication system may be tangibly embodied in storage medium 1122, which may comprise a machine-readable storage medium.

According to one example implementation, the term computing device, as used herein, may be a CPU, or conceptualized as a CPU (for example, the CPU 1102 of FIG. 11). In this example implementation, the computing device (CPU) may be coupled, connected, and/or in communication with one or more peripheral devices, such as display. In another example implementation, the term computing device, as used herein, may refer to a mobile computing device, such as a smartphone or tablet computer. In this example embodiment, the computing device may output content to its local display and/or speaker(s). In another example implementation, the computing device may output content to an external display device (e.g., over Wi-Fi) such as a TV or an external computing system.

In example implementations of the disclosed technology, the computing device 1100 may include any number of hardware and/or software applications that are executed to facilitate any of the operations. In example implementations, one or more I/O interfaces may facilitate communication between the computing device 1100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the computing device 1100. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the computing device 1100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, etc., for communication with external devices and/or systems.

As desired, implementations of the disclosed technology may include the computing device 1100 with more or less of the components illustrated in FIG. 11.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, Internet tablets, PDAs, ultra mobile PCs (UMPCs) and smartphones.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A computer-implemented method comprising:
    clustering hierarchical database records into a first set of clusters having corresponding first cluster identifications (IDs), each hierarchical database record comprising one or more field values, the clustering based at least in part on determining similarity among corresponding field values of the hierarchical database records;
    determining parent-child hierarchical relationships among the hierarchical database records;

associating related hierarchical database records by:
  determining highest compelling linkages among the hierarchical database records, the determining comprising:
    identifying mutually preferred pairs of records from the hierarchical database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria;
    assigning, for each record from the hierarchical database records, at least one associated preferred record, wherein a match value assigned to a given record together with its associated preferred record is at least as great as a match value assigned to the record together with any other record in the database records; and
    forming and storing a plurality of entity representations in the database, each entity representation of the plurality of entity representations comprising at least one linked pair of mutually preferred records;
  applying a hierarchal directional linking process, the hierarchal directional linking process comprising selecting and applying at least an upward process based on the determined parent-child hierarchical relationship wherein the upward process comprises:
    determining, from the parent-child hierarchical relationships, similarity among a plurality of child records having initial separate parent records;
    in response to determining a threshold similarity among the plurality of child records, inferring that the initial separate parent records correspond to the same entity; and
    linking, responsive to the inferring, the initial separate parent records as inferred common parent records;
  re-clustering at least a portion of the database records into a second set of clusters having corresponding second cluster IDs, the re-clustering based at least in part on the associating related hierarchical database records and on the determining similarity among corresponding field values of the database records; and
  outputting database record information, based at least in part on the re-clustering.

2. The method of claim 1, wherein the hierarchal directional linking process further comprises selecting and applying a downward process comprising linking two or more records on a given hierarchy level based at least in part on the two records sharing the inferred common parent records.

3. The method of claim 1, wherein determining the similarity among the corresponding field values of the database records comprises:
  assigning a hyperspace attribute to each database record, wherein the hyperspace attribute corresponding to two database records is correlated with a similarity of the corresponding field values of the two database records;
  determining membership of each database record in a plurality of hyperspace clusters based at least in part on the hyperspace attributes;
  assigning, to each record, a cluster ID and a match value reflecting a likelihood that the record is a member of a particular hyperspace cluster; and
  linking related records based at least in part on the cluster ID and the match value.

4. The method of claim 3, further comprising merging database records having hyperspace attribute differences within a predefined criteria to eliminate similar exemplars that are likely to represent a same entity, the merging resulting in a reduced set of database records.

5. The method of claim 4, further comprising:
  recalculating the field value weights for the reduced set of database records; and
  re-clustering the reduced set of records based at least in part on the recalculated field value weights.

6. The method of claim 3, wherein the determining membership of each database record in the plurality of hyperspace clusters further comprises creating a plurality of nodes at random locations in hyperspace, each node maintaining records in hyperspace based on the hyperspace attribute for which it is the closest node.

7. The method of claim 1, wherein each hierarchical database record corresponds to an entity representation, each hierarchical database record comprising a plurality of fields, each field configured to contain a field value, and each field value assigned a field value weight corresponding to a specificity of the field value in relation to all field values in a corresponding field of the records.

8. A computer-implemented method comprising:
  clustering hierarchical database records into a first set of clusters having corresponding first cluster identifications (IDs), each hierarchical database record comprising one or more field values, the clustering based at least in part on determining similarity among corresponding field values of the hierarchical database records;
  determining highest compelling linkages among the hierarchical database records, the determining comprising:
    identifying mutually preferred pairs of records from the hierarchical database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria;
    assigning, for each record from the database records, at least one associated preferred record, wherein a match value assigned to a given record together with its associated preferred record is at least as great as a match value assigned to the record together with any other record in the hierarchical database records; and
    forming and storing a plurality of entity representations in the database, each entity representation of the plurality of entity representations comprising at least one linked pair of mutually preferred records;
  receiving parent-child hierarchical relationship information for the hierarchical database records;
  re-clustering at least a portion of the hierarchical database records into a second set of clusters having corresponding second cluster IDs, the re-clustering based at least in part on the received parent-child hierarchical relationship information; and
  outputting hierarchical database record information, based at least in part on the re-clustering.

9. The method of claim 8, wherein determining the similarity among the corresponding field values of the hierarchical database records comprises:
  assigning a hyperspace attribute to each hierarchical database record, wherein the hyperspace attribute corresponding to two hierarchical database records is correlated with a similarity of the corresponding field values of the two hierarchical database records;

determining membership of each hierarchical database record in a plurality of hyperspace clusters based at least in part on the hyperspace attributes;

assigning, to each record, a cluster ID and a match value reflecting a likelihood that the record is a member of a particular hyperspace cluster; and linking related records based at least in part on the cluster ID and the match value.

10. The method of claim 9, further comprising merging hierarchical database records having hyperspace attribute differences within a predefined criteria to eliminate similar exemplars that are likely to represent a same entity, the merging resulting in a reduced set of hierarchical database records.

11. The method of claim 10, further comprising:
recalculating the field value weights for the reduced set of hierarchical database records; and
re-clustering the reduced set of records based at least in part on the recalculated field value weights.

12. The method of claim 8, wherein each hierarchical database record corresponds to an entity representation, each database record comprising a plurality of fields, each field configured to contain a field value, and each field value assigned a field value weight corresponding to a specificity of the field value in relation to all field values in a corresponding field of the records.

13. A system comprising:
at least one memory for storing data and computer-executable instructions; and
at least one processor configured to access the at least one memory and further configured to execute the computer-executable instructions for:
clustering hierarchical database records into a first set of clusters having corresponding first cluster identifications (IDs), each hierarchical database record comprising one or more field values, the clustering based at least in part on determining similarity among corresponding field values of the hierarchical database records;
when a hierarchy structure of the hierarchical database records is unavailable:
determining parent-child hierarchical relationships among the hierarchical database records;
associating related hierarchical database records by:
determining highest compelling linkages among the hierarchical database records, the determining comprising:
identifying mutually preferred pairs of records from the hierarchical database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria;
assigning, for each record from the hierarchical database records, at least one associated preferred record, wherein a match value assigned to a given record together with its associated preferred record is at least as great as a match value assigned to the record together with any other record in the database records; and
forming and storing a plurality of entity representations in the database, each entity representation of the plurality of entity representations comprising at least one linked pair of mutually preferred records;
applying a hierarchal directional linking process, the hierarchal directional linking process comprising selecting and applying at least an upward process based on the determined parent-child hierarchical relationship wherein the upward process comprises:
determining, from the parent-child hierarchical relationships, similarity among a plurality of child records having initial separate parent records;
in response to determining a threshold similarity among that the plurality of child records, inferring that the initial separate parent records correspond to the same entity; and
linking, responsive to the inferring, the initial separate parent records as inferred common parent records;
re-clustering at least a portion of the hierarchical database records into a second set of clusters having corresponding second cluster IDs, the re-clustering based at least in part on the associating related hierarchical database records and on the determining similarity among corresponding field values of the database records; and
when a hierarchy structure of the hierarchical database records is available:
receiving parent-child hierarchical relationship information for the hierarchical database records;
re-clustering at least a portion of the hierarchical database records into a second set of clusters having corresponding second cluster IDs, the re-clustering based at least in part on the received parent-child hierarchical relationship information; and
outputting hierarchical database record information, based at least in part on the re-clustering.

14. The system of claim 13, wherein the hierarchal directional linking process further comprises selecting and applying a downward process comprising linking two or more records on a given hierarchy level based at least in part on the two records sharing the inferred common parent records.

15. The system of claim 13, wherein determining the similarity among the corresponding field values of the hierarchal database records comprises:
assigning a hyperspace attribute to each hierarchal database record, wherein the hyperspace attribute corresponding to two hierarchal database records is correlated with a similarity of the corresponding field values of the two hierarchal database records;
determining membership of each hierarchal database record in a plurality of hyperspace clusters based at least in part on the hyperspace attributes;
assigning, to each record, a cluster ID and a match value reflecting a likelihood that the record is a member of a particular hyperspace cluster; and
linking related records based at least in part on the cluster ID and the match value.

16. The system of claim 15, further comprising merging hierarchal database records having hyperspace attribute differences within a predefined criteria to eliminate similar exemplars that are likely to represent a same entity, the merging resulting in a reduced set of hierarchal database records.

17. The system of claim 16, further comprising:
recalculating the field value weights for the reduced set of hierarchal database records; and
re-clustering the reduced set of records based at least in part on the recalculated field value weights.

18. The system of claim 15, wherein the determining membership of each database record in the plurality of hyperspace clusters further comprises creating a plurality of nodes at random locations in hyperspace, each node maintaining records in hyperspace based on the hyperspace attribute for which it is the closest node.

19. The system of claim 13, wherein each hierarchical database record corresponds to an entity representation, each hierarchical database record comprising a plurality of fields, each field configured to contain a field value, and each field value assigned a field value weight corresponding to a specificity of the field value in relation to all field values in a corresponding field of the records.

20. A non-transitory computer readable media comprising computer-executable instructions that, when executed by one or more processors, cause the one or more processors to perform a method comprising:
clustering hierarchical database records into a first set of clusters having corresponding first cluster identifications (IDs), each hierarchical database record comprising one or more field values, the clustering based at least in part on determining similarity among corresponding field values of the hierarchical database records;
when a hierarchy structure of the hierarchical database records is unavailable:
determining parent-child hierarchical relationships among the hierarchical database records;
associating related hierarchical database records by:
determining highest compelling linkages among the hierarchical database records, the determining comprising:
identifying mutually preferred pairs of records from the hierarchical database records, each mutually preferred pair of records consisting of a first record and a second record, the first record consisting of a preferred record associated with the second record and the second record consisting of a preferred record associated with the first record, wherein the mutually preferred pairs of records each has a match score that meets pre-specified match criteria;
assigning, for each record from the hierarchical database records, at least one associated preferred record, wherein a match value assigned to a given record together with its associated preferred record is at least as great as a match value assigned to the record together with any other record in the database records; and
forming and storing a plurality of entity representations in the database, each entity representation of the plurality of entity representations comprising at least one linked pair of mutually preferred records;
applying a hierarchal directional linking process, the hierarchal directional linking process comprising selecting and applying at least an upward process based on the determined parent-child hierarchical relationship wherein the upward process comprises:
determining, from the parent-child hierarchical relationships, similarity among a plurality of child records having separate parent records; and
in response to determining a threshold similarity among that the plurality of child records, inferring that the separate parent records correspond to the same entity;
re-clustering at least a portion of the hierarchical database records into a second set of clusters having corresponding second cluster IDs, the re-clustering based at least in part on the associating related hierarchical database records and on the determining similarity among corresponding field values of the database records; and
when a hierarchy structure of the hierarchical database records is available:
receiving parent-child hierarchical relationship information for the hierarchical database records;
re-clustering at least a portion of the hierarchical database records into a second set of clusters having corresponding second cluster IDs, the re-clustering based at least in part on the received parent-child hierarchical relationship information; and
outputting hierarchical database record information, based at least in part on the re-clustering.

* * * * *